(12) United States Patent
Sexton et al.

(10) Patent No.: US 10,528,662 B2
(45) Date of Patent: *Jan. 7, 2020

(54) AUTOMATED DISCOVERY USING TEXTUAL ANALYSIS

(71) Applicant: Ayasdi AI LLC, Menlo Park, CA (US)

(72) Inventors: Harlan Sexton, Palo Alto, CA (US); Jennifer Kloke, Mountain View, CA (US)

(73) Assignee: Ayasdi AI LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,030

(22) Filed: Feb. 13, 2018

(65) Prior Publication Data

US 2018/0173697 A1    Jun. 21, 2018

Related U.S. Application Data

(63) Continuation of application No. 14/481,546, filed on Sep. 9, 2014, now Pat. No. 9,892,110.

(60) Provisional application No. 61/875,641, filed on Sep. 9, 2013.

(51) Int. Cl.
*G06F 17/27* (2006.01)
*G06F 16/35* (2019.01)
*G06F 17/22* (2006.01)

(52) U.S. Cl.
CPC ........ *G06F 17/2765* (2013.01); *G06F 16/358* (2019.01); *G06F 17/2211* (2013.01); *G06F 17/2229* (2013.01)

(58) Field of Classification Search
CPC .......................... G06F 17/2714; G06F 17/2765
See application file for complete search history.

(56) References Cited

U.S. PATENT DOCUMENTS

| 2005/0149494 | A1 | 7/2005 | Lindh |
| 2008/0114750 | A1 | 5/2008 | Saxena |
| 2009/0327259 | A1 | 12/2009 | Smith |
| 2010/0082262 | A1 | 4/2010 | Kato |
| 2010/0268751 | A1 | 10/2010 | Hirata |

(Continued)

OTHER PUBLICATIONS

International Application No. PCT/US2014/054815, International Search Report and Written Opinion dated Dec. 15, 2014.

*Primary Examiner* — Etienne P Leroux
(74) *Attorney, Agent, or Firm* — Ahmann Kloke LLP

(57) ABSTRACT

An example method includes receiving text from a plurality of documents, segmenting text received text of the plurality of documents, calculating a frequency statistic for each segment of each document, determining segments of potential interest of each document based on calculated frequency statistic, calculating distances between each document of the plurality of documents based on a text metric, and storing segments of potential interest of each document and the distances in a search database. The method may further include receiving a search query and performing a search of information contained in the search database, partitioning documents of search results using the distances, for each partition, determining labels of segments of potential interest for documents of that particular partition, the labels being determined based on a plurality of frequency statistics, and providing determined labels of segments of potential interest for documents of each partition.

19 Claims, 29 Drawing Sheets

(19 of 29 Drawing Sheet(s) Filed in Color)

(56) References Cited

U.S. PATENT DOCUMENTS

| | | |
|---|---|---|
| 2011/0010372 A1 | 1/2011 | Sahasrabudhe |
| 2011/0060983 A1 | 3/2011 | Cai |
| 2011/0144978 A1* | 6/2011 | Tinkler ............... G06F 17/2715 |
| | | 704/10 |

* cited by examiner

AUTOMATED DISCOVERY USING TEXTUAL ANALYSIS

CROSS REFERENCE TO RELATED APPLICATIONS

The present application is a continuation of U.S. patent application Ser. No. 14/481,546 filed Sep. 9, 2014 and entitled "Automated Discovery Using Textual Analysis," now U.S. Pat. No. 9,892,110, which claims priority to U.S. Provisional Patent Application Ser. No. 61/875,641 filed Sep. 9, 2013 and entitled "Systems and Methods for Textual Analysis," which are hereby incorporated by reference herein.

TECHNICAL FIELD

The present disclosure generally relates to text analysis of a plurality of documents and, more particularly to techniques for advertisement revenue sharing with partners that preinstall applications on digital devices.

BACKGROUND

Keyword based text searching is ubiquitous. For example, Google utilizes a fairly typical keyword-based search technology (brilliantly implemented to scale). Keyword searches find all the documents matching some pattern of text (e.g., usually the presence of some collection of words) and returns a list of documents sorted by "value." In the case of Google, the corpora is that part of the world-wide-web accessible to their crawlers, and the value function makes use of massive human effort in choosing which pages to link, and likely by keeping track of which pages people select when a given search is completed. One difficulty with such searches is they do not make any use of the intrinsic contents of the corpus (if Google did not have access to all this human evaluation, the search would be poor), and the results are returned as a (usually very long) list.

Keyword search can be improved by having thesauri augment the set of words, but if the corpus is private, the value function is necessarily very poor.

SUMMARY

In various implementations, an exemplary method includes receiving text from a plurality of documents, segmenting text received text of the plurality of documents, calculating a frequency statistic for each segment of each document, determining segments of potential interest of each document based on calculated frequency statistic, calculating distances between each document of the plurality of documents based on a text metric, and storing segments of potential interest of each document and the distances in a search database. The method may further include receiving a search query and performing a search of information contained in the search database, partitioning documents of search results using the distances, for each partition, determining labels of segments of potential interest for documents of that particular partition, the labels being determined based on a plurality of frequency statistics, and providing determined labels of segments of potential interest for documents of each partition.

The method may further comprise displaying labels of segments of potential interest for documents of each partition. In some embodiments, the method may further comprise generating a graph of nodes and edges connecting nodes, where each node represents a document of the search results and each edge between nodes is based on the distances.

The frequency statistic may be a log likelihood function. In some embodiments, a segment of potential interest is determined by comparing a related log likelihood score associated with the segment to a likelihood threshold. The text metric may be or include a cosine term frequency-inverse document frequency (tf-idf).

In some embodiments, the method may further comprise filtering the text to remove common or unwanted phrases. In various embodiments, the method may comprise approximating a distance measure between two documents in the search results using a Dijkstra's algorithm.

An exemplary system comprises a corpus module, a text selection module, a distance module, and a search module. The corpus module may be configured to receive text from a plurality of documents. The text selection module may be configured to segment text received text of the plurality of documents, to calculate a frequency statistic for each segment of each document, and to determine segments of potential interest of each document based on calculated frequency statistic. The distance module may be configured to calculate distances between each document of the plurality of documents based on a text metric. The search database may be configured to store segments of potential interest of each document and the distances in a search database.

The system may further comprise a search module, a partition module, and a label module. The search module may be configured to receive a search query and to perform a search of information contained in the search database using the search query to identify documents for search results. The partition module may be configured to partition documents of search results using the distances. The label module may be configure to, for each partition, determine labels of segments of potential interest for documents of that particular partition, the labels being determined based on a plurality of frequency statistics, each frequency statistic being associated with a document for that particular partition, the label module further configured to provide determined labels of segments of potential interest for documents of each partition to search client for display.

A non-transitory computer readable medium may comprise executable instructions, the instructions being executable by a data processing device to perform a method. The method may comprise receiving text from a plurality of documents, segmenting text received text of the plurality of documents, calculating a frequency statistic for each segment of each document, determining segments of potential interest of each document based on calculated frequency statistic, calculating distances between each document of the plurality of documents based on a text metric, and storing segments of potential interest of each document and the distances in a search database. The method may further include receiving a search query and performing a search of information contained in the search database, partitioning documents of search results using the distances, for each partition, determining labels of segments of potential interest for documents of that particular partition, the labels being determined based on a plurality of frequency statistics, and providing determined labels of segments of potential interest for documents of each partition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1:
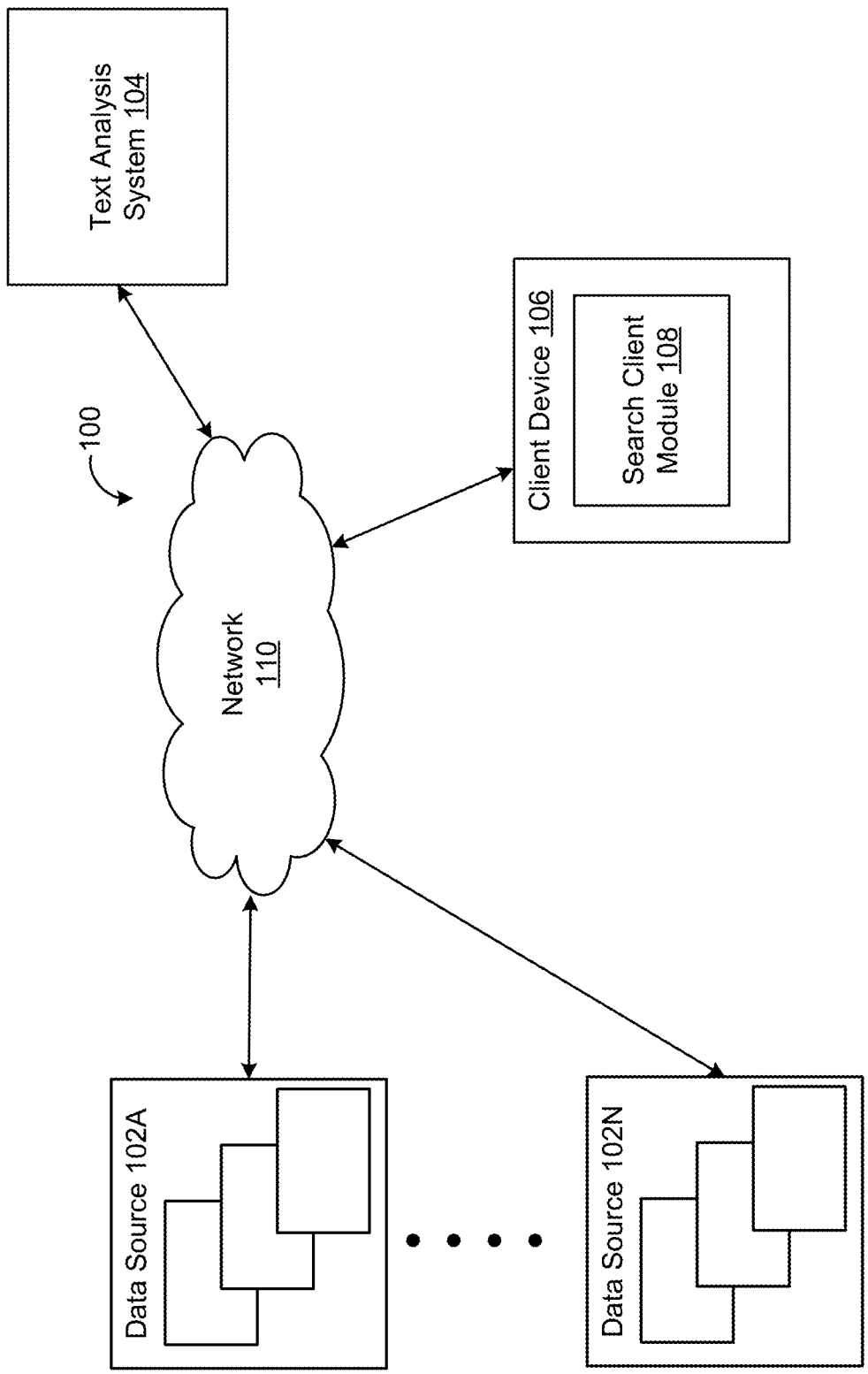
FIG. 1 is an illustration of an environment including data sources, a text analysis system, and a client device each in communication over a network in some embodiments.

FIG. 1 is an illustration of an environment including data sources 102A-N, a text analysis system 104, and a client device 106 each in communication over a network 110 in some embodiments. The data sources include any number of digital devices that store documents. A digital device is any device with a processor and memory. Data sources include, but are not limited to, web servers, file servers, mail servers, ftp servers, storage networks, storage devices, or any device with a computer readable medium containing documents.

A document is any electronic file containing text. A document may include other objects such as graphs, tables, pictures, animation, audio, and/or the like. Documents received by the text analysis system 104 may be or include web pages, email, word processing documents, spreadsheets, ebooks, drawings, transcriptions, media objects, slides or the like from any number of data sources 102A-N. In some embodiments, the document may include images of text that may be converted into text by the text analysis system 104.

The documents may be received from any number of data sources 102A-N including, for example, one or more systems (e.g., digital devices including systems or servers that may include one or more libraries). In one example, the text analysis system 104 may receive any number of patent documents (e.g., patent applications, file wrapper documents, or the like) from the US Patent and Trademark Office. In other examples, the text analysis system 104 may receive any number of ebooks from Project Gutenberg, email from corporate email servers, financial documents from accounting systems, tax documents from governmental agencies, contracts from law firms, case law from judicial court publishers, science journals from libraries, or the like.

The text analysis system 104 may retrieve or receive documents from any number of data sources 102A-N. As described in greater detail with regard to FIGS. 3-7, the text analysis system 104 prepares a search database using the text from any number of data sources 102A-N. For example, generally, the text analysis system 104 may generate a corpus set of text from any or all of the documents. In various embodiments, the text analysis system 104 calculates a frequency statistic for segments of text in the corpus set and calculates distances between documents in corpus set using at least one text metric. For each document, the text analysis system 104 may store the text, associated frequency statistic, document metadata (e.g., author, creation data, description, type of document, or the like), and distances between the document and any number of the other documents in a search database.

The text analysis system 104 may receive a search request from the client device 106. The search request may be any search query for information from the search database. The text analysis system 104 may generate search results based on the search query and the search database. In various embodiments, the text analysis system 104 performs a search using the search query on all of the text of the documents (e.g., not only segments associated with frequency statistics) and/or document metadata. The search results may include a subset of documents in the search database (e.g., a subset of documents received by the text analysis system 104.

The text analysis system 104 may partition the documents in the search results using distances generated using text metrics. For each partition, the text analysis system 104 may generate labels associated with text segments of interest to provide to the client device 106. For example, for each member document of a partition, the text analysis system 104 may collect text segments of potential interest as well as the related frequency statistic. The text analysis system 104 may identify a subset of the collected text segments of potential interest using the collected frequency statistic and then generate one or more labels for the text segments of the identified sub set.

It will be appreciated that some of the steps described herein may be performed by the text analysis system 104 before a search query is received (e.g., preprocessing) or after the search query is received (e.g., in real time). Additional steps and/or functions may be apparent depending on when functions are to occur.

The text analysis system 104 may provide the labels to the client device 106. For example, the text analysis system 104 may provide search results, including the labels to the client device 106 in an interface generated by the search client module 108. It will be appreciated that any of the information related to the search query and the search results (e.g., any information contained in the search database or the documents associated with the search results) may be provided by the text analysis system 104 and/or displayed to the user of the client device 106.

The search client module 108 is an application that allows or enables access to a search system. The search client module 108 may display an interface that allows a user of the client device 106 to provide the search query to the text analysis system 104 and to receive search results (e.g., including the labels). The search results may be a list of documents responsive to the search query. The labels from the text analysis system 104 may associated with any of the documents in the list of documents. The search client module 108 may receive further search queries, such as but not limited to, new search queries, restricted selections, or expanded selections to further explore the search results and/or additional information associated with the search database of the text analysis system 104.

In various embodiments, the user may interact with the search client module 108 to retrieve documents from the search database of the text analysis system 104 and/or retrieve documents from any number of data sources 102A-N. The search client module 108 may be an application such as a browser or a dedicated application. The search results including labels may be displayed by the text analysis system 104 and/or the client device 106.

The client device 106 is any digital device that may include the search client module 108. The client device 106 may, for example, be a personal computer, mobile device, wearable device, media device, laptop computer, smartphone, tablet, or the like.

A module is any hardware, software, or combination of hardware and software. Although each system depicts one or more modules, it will be appreciated that any module may perform more or less functionality that what is described herein. Further, each system may have any number of modules, processors, digital devices, or the like.

Figure 2:
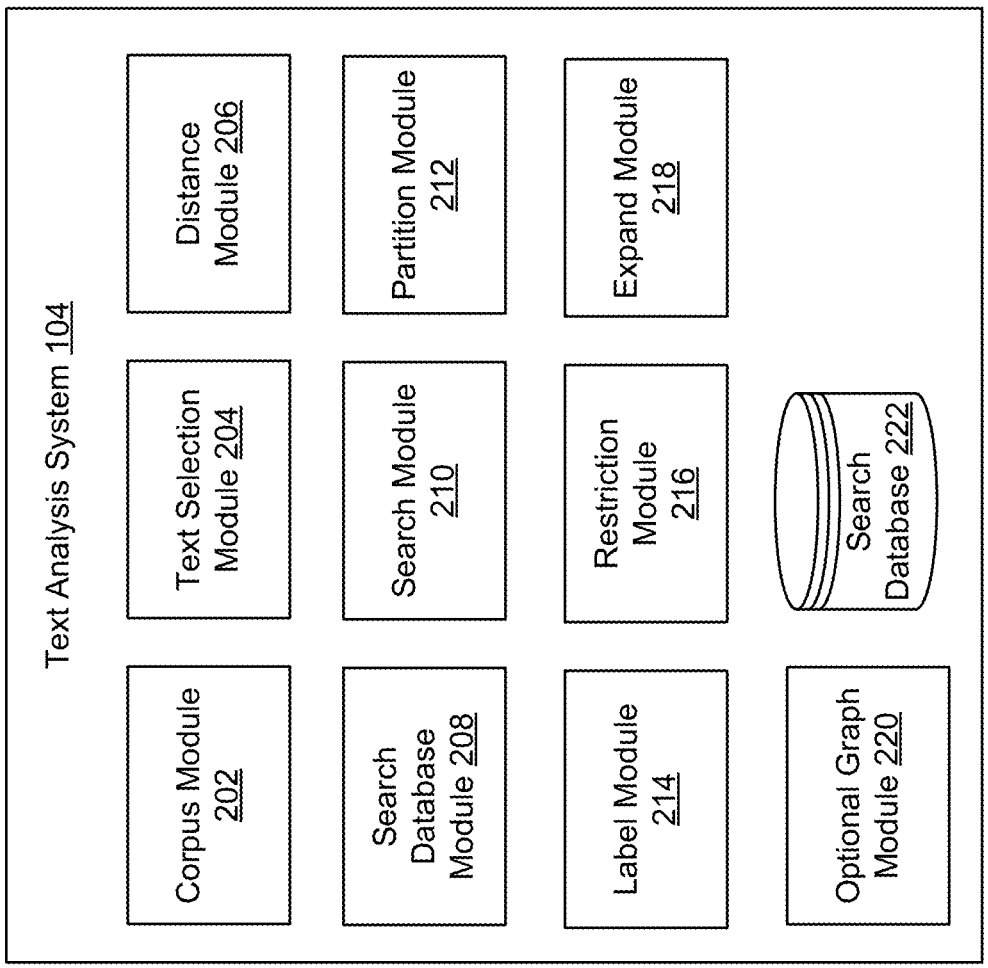
FIG. 2 is a block diagram of the text analysis system in some embodiments.

FIG. 2 is a block diagram of the text analysis system 104 in some embodiments. The text analysis system 104 may include a corpus module 202, a text selection module 204, a distance module 206, a search database module 208, a search module 210, a partition module 212, a label module 214, a restriction module 216, an expand module 218, an optional graph module 220, and a search database 222. The corpus module 202 receives a plurality of documents from any number of the data sources 102A-N and generates a corpus set of text associated with the documents. A corpus set is a collection of documents, or parts of documents. For example, the corpus set may contain text or text segments each associated with one or more documents of the one or more data sources 102A-N. The corpus set may include all text of all documents or only some text from all or some of the documents. In some embodiments, an association between text or text segments and the document that contains the text or text segments is also stored in the corpus set. The corpus set may be contained in any number of data structures (e.g., databases, tables, arrays, queues, or the like) on any number of storage devices (e.g., remote or local storage servers, hard drives, flash memory, or the like).

The text selection module 204 may segment or parse parts of text from one or more of the documents received by the corpus module 202 to generate a first set of text segments. The text selection module 204 may segment the text from any number of the documents of the corpus set in any number of ways. In some embodiments, the text selection module 204 segments or parses text from one or more documents of the corpus set and, subsequently, may identify some of the segments of the text as segments of potential interest. In various embodiments, the text selection module 204 initially identifies segments of potential interest prior to generating text segments. It will be appreciated that the text selection module 204 may filter undesired text segments (e.g., may remove some text segments initially identified as being of potential interest) or identify text segments as being of potential interest at any time.

In one example, for each document in the corpus set, the text selection module 204 may optionally retrieve a dictionary of common terms that identify common parts of speech (e.g., some prepositions, conjunctions, and the like including, for example, "the" and "and") and ignore phrases of text using the dictionary of common terms. In various embodiments, the dictionary of common terms may include additional phrases that are specific to a specific type of documents. For example, if the documents were patent applications, the dictionary of common terms may identify phrases that are common in many patent applications such as "patent," "invention," "disclosure," "embodiments," "examples," "in some," "detailed description," "a system comprising:," "a method comprising," "claims," and "abstract." The text selection module 204 may identify stems of words (e.g., using a stemmer) to further identify roots for filtering undesired terms or identifying segments of potential interest.

In some embodiments, the text selection module 204 utilizes natural language processing (NLP) to segment each document and/or identify the segments to include in the first set of text segments. The text selection module 204 may utilize NLP to select segments of the document based on parts of speech. For example, the text selection module 204 may utilize NLP to select nouns, nouns followed by another noun (i.e., noun noun patterns), adjective nouns (i.e., adjective noun patterns), and verbs. It will be apparent that the text selection module 204 may select words based on any pattern of words and/or parts of speech. The text selection module 204 may utilize any NLP software including, for example, the Stanford NLP Library or the Natural Language Toolkit (NLTK). Each selected segment may be associated with the document where the particular selected segment originated.

In various embodiments, the text selection module 204 may utilize a likelihood function to generate frequency statistics for any number of segments in each document. For each document, the text selection module 204 may utilize the likelihood function to identify segments (e.g., phrases) that are unexpected (e.g., that appear in the document an unexpected of times). For example, the text selection module 204 may utilize the likelihood function to identify the total number of times a phrase appears in all of the documents of the corpus set (i.e., the observed phrase in the corpus) to enable a calculation of the expected number of times the same phrase appears in each document. If the phrase is in a document significantly more times than expected, the phrase (i.e., the segment) may be identified as a segment of potential interest. Examples of likelihood functions are further described regarding FIGS. 3-5 herein. The search database module 208 may store segments of potential interest in the search database 222 as described herein.

The distance module 206 may calculate distances between documents from the data sources 102A-N using one or more distance metrics. In some embodiments, the distance module 206 calculates distances between documents using at least one text metric. For example, the distance module 206 may utilize a term frequency-inverse document frequency (tf-idf) to calculate the distances. A distance is calculated using tf-idf by determining a relative frequency of a segment (e.g., a word or phrase) in a specific document compared to the inverse proportion of that segment over the entire document corpus set. The tf-idf is well understood in the art.

For example, the distance module 206 may determine tf-idfs of all segments of potential interest in a first document. The distance module 206 may also determine tf-idfs of all segments of potential interest in a second document. Subsequently, the distance module 206 may take a cosine of the tf-idfs from the first document and the tf-idfs of the second document to compute a distance (i.e., a tf-idf cosine score using tf-idfs of the first and second documents).

The search database module 208 may store segments of potential interest from the text selection module 204 in the search database 222. In various embodiments, the search database module 208 may store, in the search database 222, any of the text from any number of documents from the data sources 102A-N. For example, for each document, the search database module 208 may store a document identifier, all text of that document, segments of potential interest from that document identified by the text selection module 204, frequency statistics for the segments of potential interest calculated by the text selection module 204, and/or associations between each segment of potential interest and that document that contained the segment. Further, for each document, the search database module 208 may store, in the search database 222, document metadata, distances between that document and any number of the other documents of the corpus set, and/or any other information. Document metadata may include, for example, document type, author(s), publication date, publication source, location of document (e.g., URL or address), classification, subclassification, identifiers, genre, context, or any other information.

The search module 210 may receive a search request from the client device 106. The search request may include a search query for information contained in the search database 222. The search query may include words, numbers, and/or symbols or the like. The search module 210 may perform a search of any information contained in the search database 222 using the search query received from the client device 106. For example, the search module 210 may perform a search of all text in the documents (i.e., not segments of interest) and/or metadata contained in the search database 222. The search module 210 generates search results based on the search.

The partition module 212 partitions (e.g., groups) the search results. In various embodiments, the partition module 212 groups documents identified in the search results using the computed distances calculated by the distance module 206 (e.g., the computed distances for each document to each other document in the corpus set being potentially stored in the search database 222).

In some embodiments, the partition module 212 selects a predetermined number of documents from the search results to create a guide set. The selection may be at random. The partition module 212 may retrieve distances between each of the documents in the search results and each of the members of the guide set. Subsequently, for each document in the search results, the partition module 212 may identify at least one of the closest members in the guide set using the retrieved distances to form a plurality of partitions. Exemplary partition processes are further described with regard to FIGS. 3, 5, 6A, and 6B.

For each partition identified by the partition module 212, the label module 214 generates labels based on segments of potential interest of member documents of that partition. The labels may be displayed to the user of the client device 106 and utilized to better inform the user of information associated with at least one or more documents in the search results.

In various embodiments, for each partition, the label module 214 may collect all frequency statistics of segments of potential interest for all documents that are members of that set. Using the frequency statistics, the label module 214 may select a predetermined number of segments of potential interest. The label module 214 may adjust (e.g., add or remove weight to) the frequency statistics as described herein. The label module 214 may generate labels describing or including the selected segments of potential interest.

The search module 210 may provide the search results, labels from the label module 214, and/or any other information to the client device 106.

The restriction module 216 may receive a restricted selection of documents from the client device 106. For example, a user may select one or more documents of a graph or one or more documents associated with labels in an interface. In one example, the selection may be a subset of documents of the search results (e.g., a restricted selection of documents).

Figure 5:
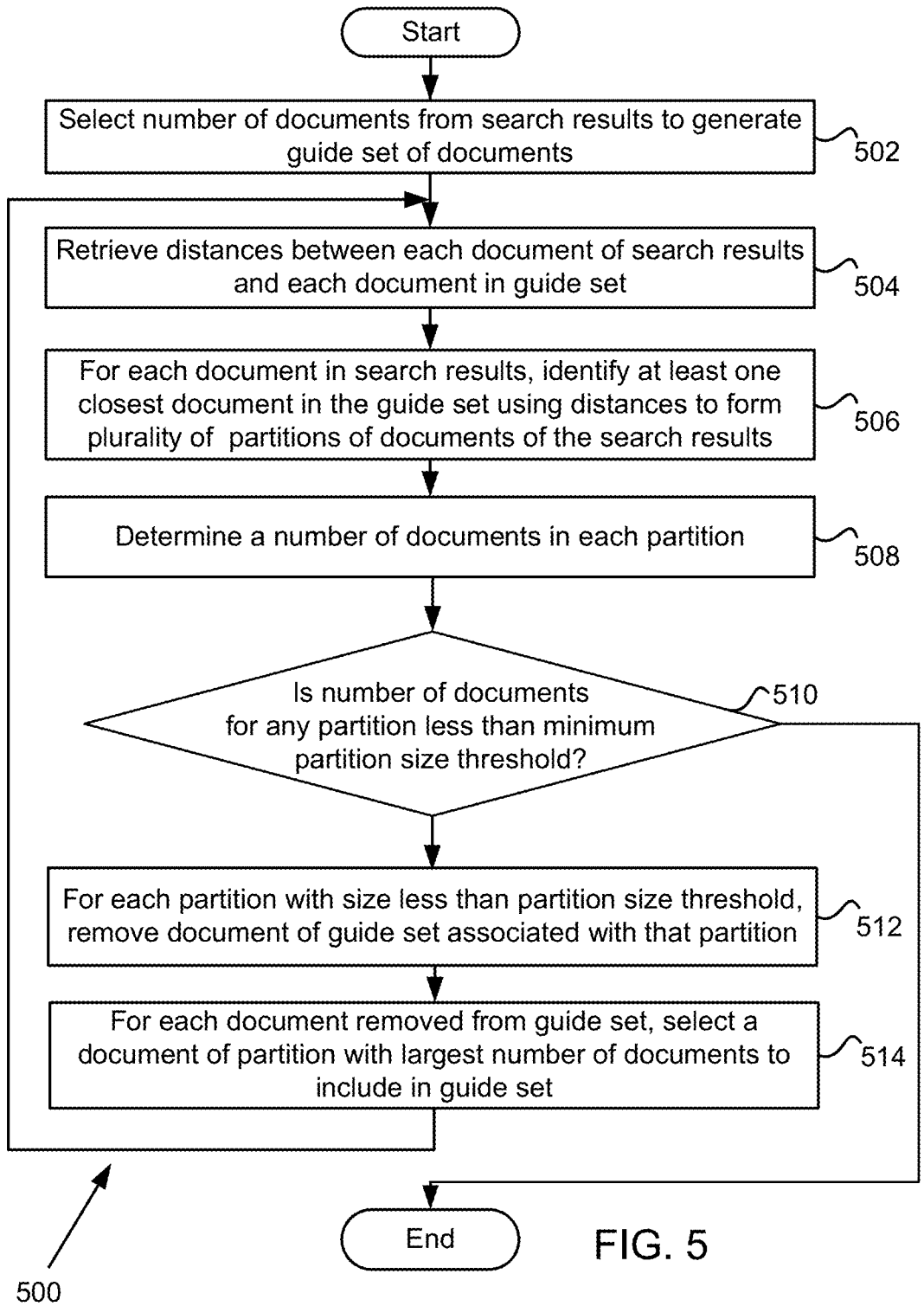
FIG. 5 is a flowchart for partitioning search results in some embodiments.

The partition module 212 may partition the restricted selected documents as described herein (see steps 502-506 in FIG. 5 for example). Further, as similarly described, the label module 214 may generate labels using the restricted selected documents and the search module 210 may provide the identifiers of documents associated with the restricted selected documents, new labels, and/or any other information to the client device 106.

Figure 8:
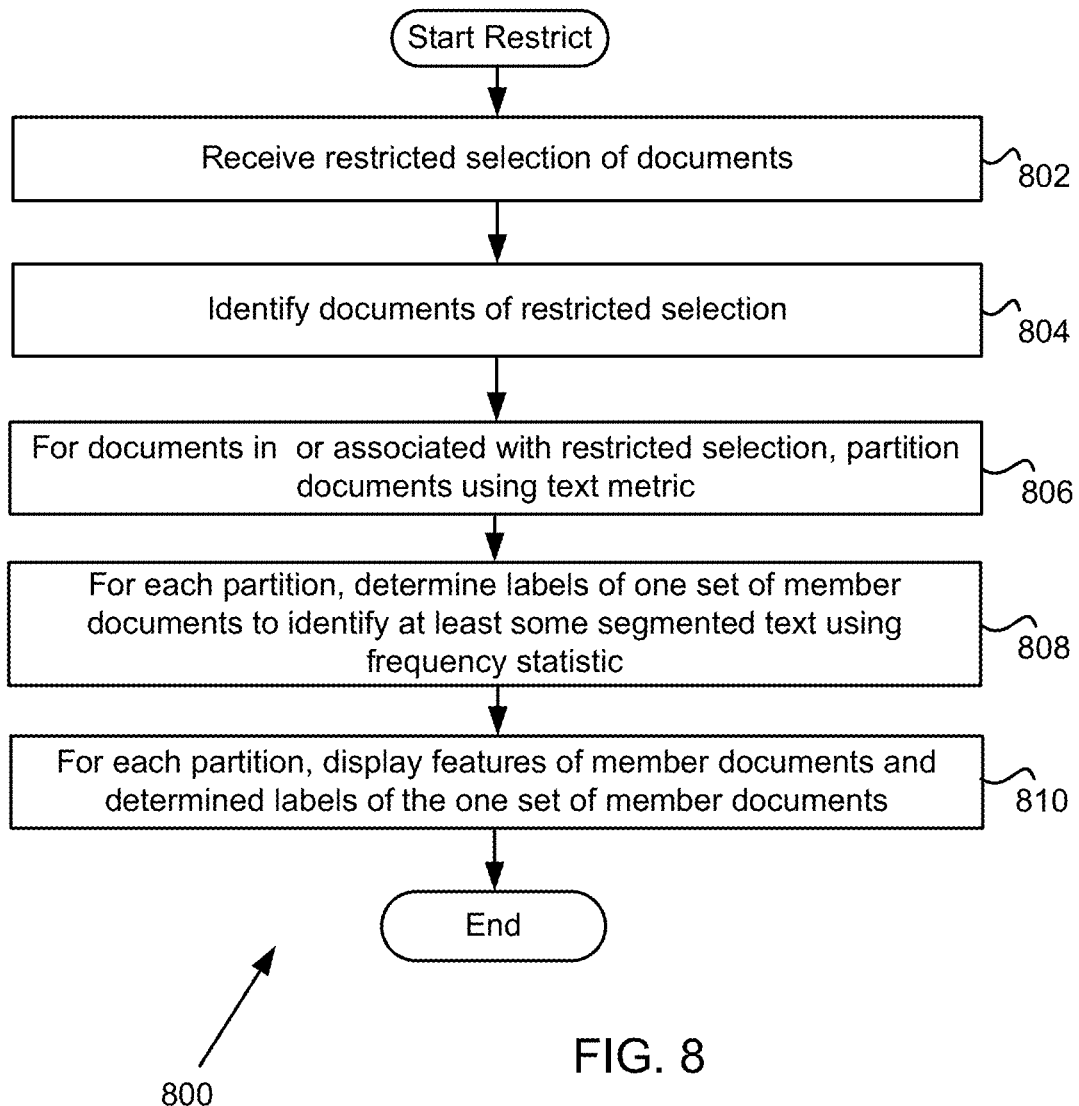
FIG. 8 is a flowchart for restricting a set of documents in some embodiments.

A process receiving a restricted selected of documents, performing the restricted search, and providing results is described with regard to FIG. 8.

The expand module 218 may receive an expanded selection including selected documents from the client device 106. In some embodiments, a user of the client device 106 (e.g., the user of the search client module 108) may select one or more documents, labels (e.g., associated with segments of potential interest of documents in the search results), or any other information associated with documents.

The expand module 218 may receive the expanded selection and may determine the nearest neighbors of documents in the corpus set to documents in the expanded selection. For example, the expand module 218 may identify documents associated with expanded selection (e.g., either by document identifier or by identifying documents related to selected labels, segments of potential interest, or any other information). The expand module 218 may determine a number of nearest neighbors (e.g., 20) of nearest neighbor documents in the corpus set using the distances calculated by the distance module 206. The selected documents and the nearest neighbors may be included in an expanded selection set of documents.

The partition module 212 may partition the expanded selection set of documents as described herein (see steps 502-506 in FIG. 5 for example). Further, as similarly described, the label module 214 may generate labels using the expanded selection set of documents and the search module 210 may provide the identifiers of the documents in the expanded selection set, new labels, and/or any other information to the client device 106.

Figure 9:
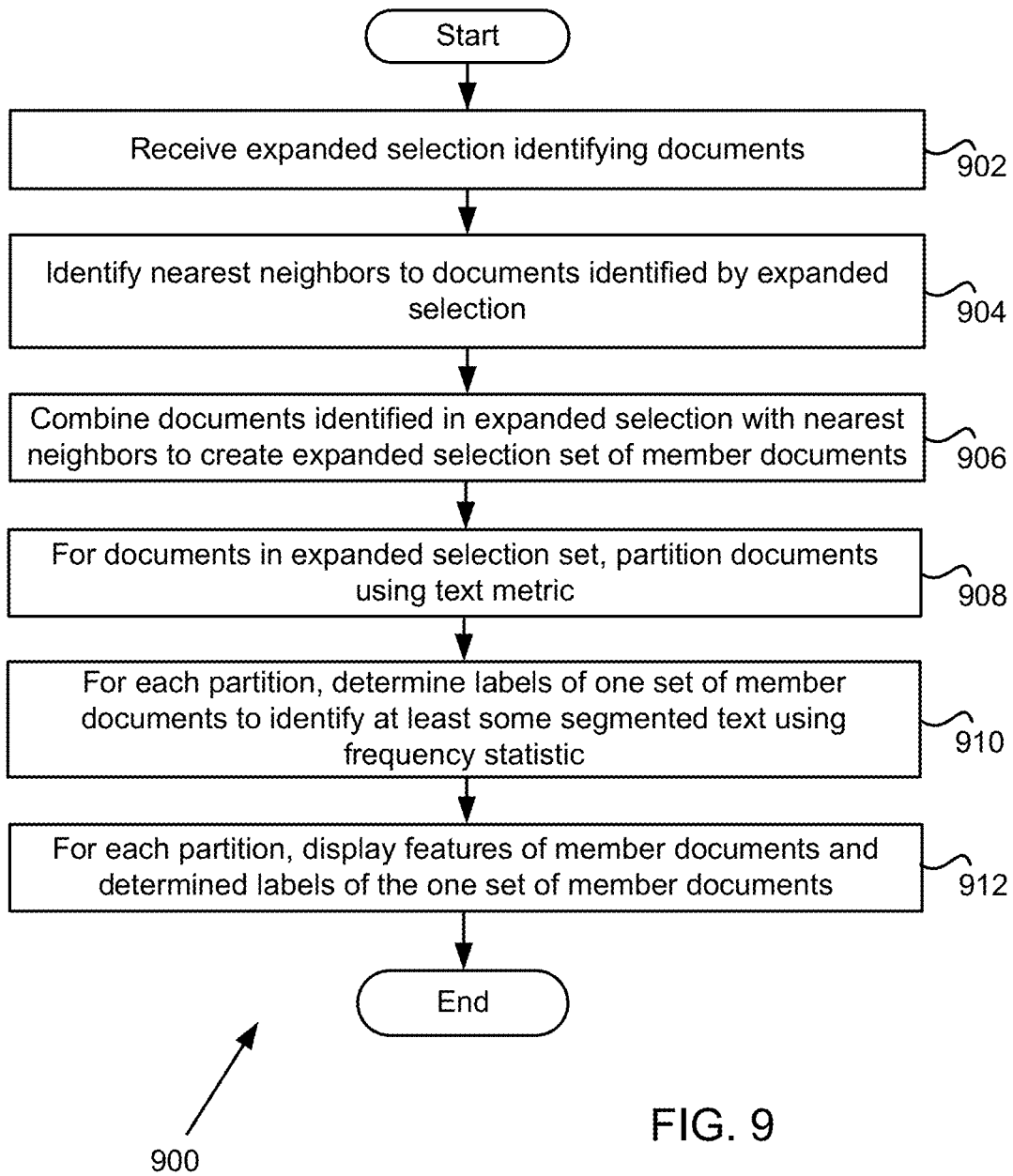
FIG. 9 is a flowchart for receiving an expanded selection in some embodiments.

A process receiving an expanded selection set, determining nearest neighbors, partitioning the selected documents and the nearest neighbors, generating labels and providing information to the user based on the expanded selection set is described with regard to FIG. 9.

The optional graph module 220 may generate a graph of the search results in some embodiments. The graph may include nodes (e.g., balls) and edges (e.g., connections between nodes). In one example, each node of the graph may represent a document of the search results.

Edges between nodes may be determined in any number of ways. For example, for each document in the search results, the optional graph module 220 may determine a number (e.g., 200) of nearest neighbor documents in the corpus set using the distances calculated by the distance module 206. For each particular document in the search results, the optional graph module 220 may determine if any of the identified nearest neighbor documents (e.g., documents that are the nearest neighbor to the particular document) are part of the search results. If one or more of the nearest neighbor documents are part of the search results, then the optional graph module 220 may generate an edge or line from the particular node to each of the nearest neighbor documents that are part of the search results.

In some embodiments, the optional graph module 220 may generate the edges based on a number of nearest neighbor documents in the search results.

The number of nearest neighbor documents may be predetermined, based on the search results (e.g., number of documents in search results, size of corpus, distribution of documents based on distance, and/or the like), based on information from the search database 222, and/or based on the corpus set.

Figure 3:
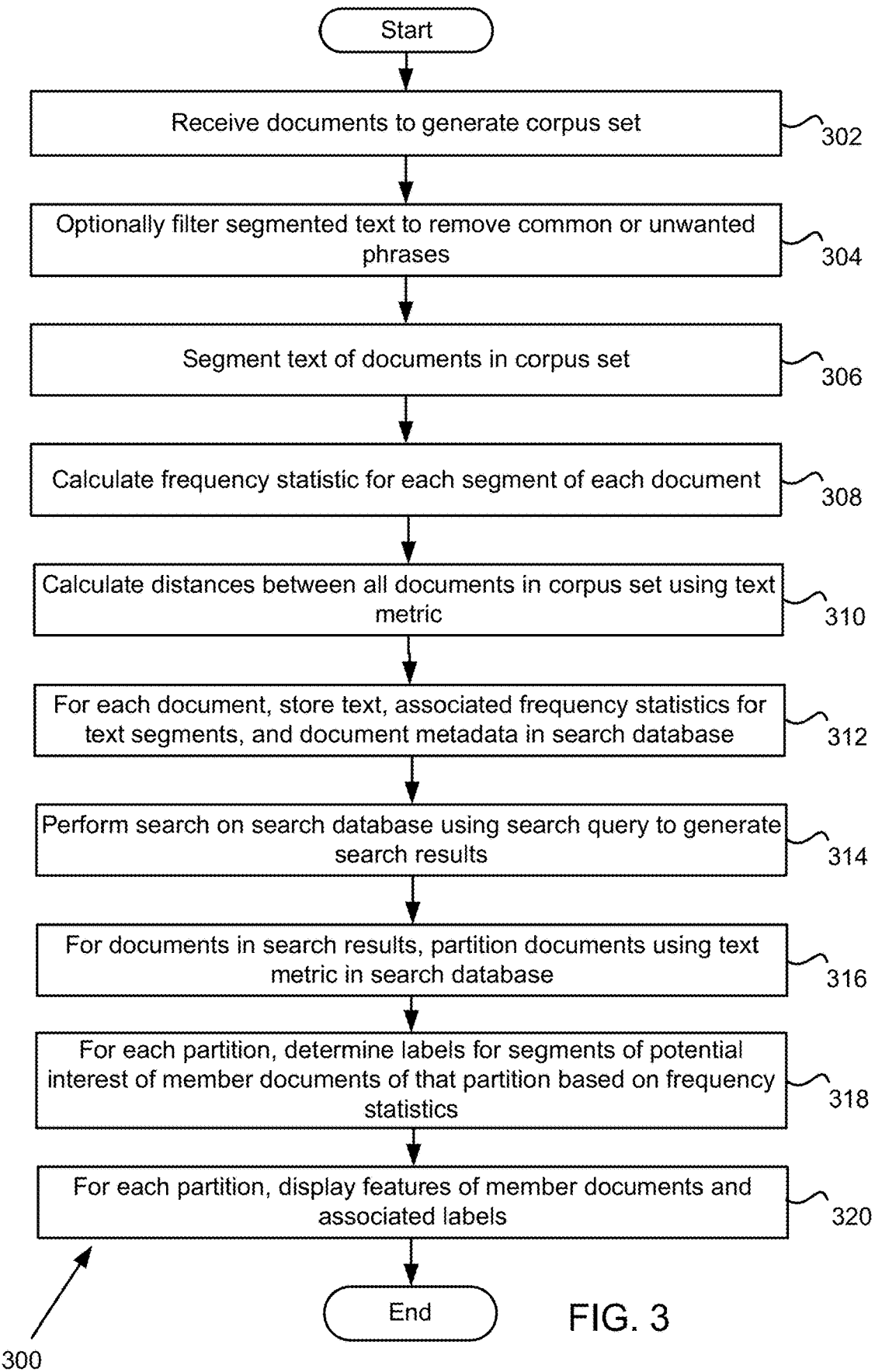
FIG. 3 is a flowchart for text analysis, receiving a search request, and providing search results in some embodiments.

FIG. 3 is a flowchart for text analysis, receiving a search request, and providing search results in some embodiments. In step 302, the corpus module 202 receives documents and generates a corpus set. In various embodiments, the corpus module 202 does not receive documents but rather receives text (e.g., all text or segments of text) from any number of documents. In one example, the corpus module 202 may receive a copy of text on any number of documents stored on the data sources 102A-N.

In step 304, the corpus module 202 may optionally filter the text to removed common or undesired words or phrases (e.g., utilizing a dictionary of common terms and/or dictionaries for specific types of documents). Further, the corpus module 202 may filter the text to remove text based on parts of speech or any other pattern recognition.

It will be appreciated that the corpus module 202 may filter and/or segment words to include in the corpus set.

In step 306, the corpus module 202 may segment text of documents in corpus set. In some embodiments, segments (e.g., phrases) may be identified based on sentence structure and parts of speech. It will be appreciated that segments may include any number of words. For example, the corpus module 202 could examine ngram of different sizes. The corpus module 202 could scan text of a document, for example, to identify ngrams of different sizes that may be segments of potential interest. Identification of ngrams as well as determining that an ngram of any size may qualify as a segment of potential interest may be based on NLP software and/or a frequency statistic as described herein.

In step 308, the text selection module 204 may calculate a frequency statistic of segments identified by the corpus module 202 for each document. In some embodiments, each document may include a plurality of segments, each of the plurality of segments corresponding to a frequency statistic. The frequency statistic may be based on a likelihood function as described with regard to FIG. 4. The frequency statistic may be determined any number of ways.

In various embodiments, the text selection module 204 may identify any number of segments of each document as a segment of potential interest. For example, the text selection module 204, for each segment, the text selection module 204 may compare the frequency statistic or a version of the frequency statistic to a threshold to determine if the related segment qualifies as a segment of interest (e.g., a segment that appears significantly more often than expected in a document). A process of determining if a segment is a segment of potential interest is discussed with regard to FIG. 4.

In step 310, the distance module 206 may determine distances between all documents in corpus set using text metric. As described herein, the distance module 206 may determine distances between any two documents using the cosine tf-idf scoring using tf-idfs calculated for segments of potential interest of each document. It will be appreciated that any metric, or combination of metrics, may be used by the distance module 206 to determined distances.

In step 312, as discussed herein, the search database module 208 may store the document identifier, all text of that document, segments of potential interest from that document identified by the text selection module 204, frequency statistics for the segments of potential interest calculated by the text selection module 204, and/or associations between each segment of potential interest and that document that contained the segment. Further, for each document, the search database module 208 may store, in the search database 222, document metadata, distances between that document and any number of the other documents of the corpus set, and/or any other information. Document metadata may include, for example, document type, author(s), publication date, publication source, location of document (e.g., URL or address), classification, subclassification, identifiers, genre, context, or any other information.

Although a search database 222 is depicted in FIG. 2, it will be appreciated that the search database module 208 may store all or some of the information in any number of databases at any location (e.g., storage networks, multiple storage devices, and/or the like).

In step 314, the search module may perform a search on the stored information using a search query to generate search results. As described herein, the search module 210 may receive a search request from the client device 106. The search module 210 may perform a search of any information contained in the search database 222 using the search query received from the client device 106. For example, the search module 210 may perform a search of all text in the documents (i.e., not segments of interest) and/or metadata contained in the search database 222. The search module 210 generates search results based on the search.

In step 316, the partition module 212 may partition documents in search results using the metric (e.g., text metric) on segments in search database. As described herein, the partition module 212 selects a predetermined number of documents from the search results to create a guide set. The selection may be at random. The partition module 212 may retrieve distances (e.g., from the search database 222) between each of the documents in the search results and each of the members of the guide set. Subsequently, for each document in the search results, the partition module 212 may identify at least one of the closest members in the guide set using the retrieved distances to form a plurality of partitions.

In step 318, for each partition, the label module 214 determines labels based on segments of potential interest of member documents of that partition. For example, the label module 214 may collect frequency statistics of segments of potential interest for all documents that are members of that partition. Using the frequency statistics, the label module 214 may select a predetermined number of segments of potential interest (e.g., the segments of potential interest associated with the top ten frequency statistics). The label module 214 may adjust (e.g., add or remove weight to) the frequency statistics as described herein. The label module 214 may generate labels describing or including the selected segments of potential interest.

In step 320, the search module 210, label module 214 or optional graph module 220 may display, for each partition, features of member documents and the labels for that partition. In some embodiments, the label module 214 and/or the search module 210 provides the search results, including features of member documents and/or labels to the client device 106 for display (e.g., by the search client module 108).

Figure 4:
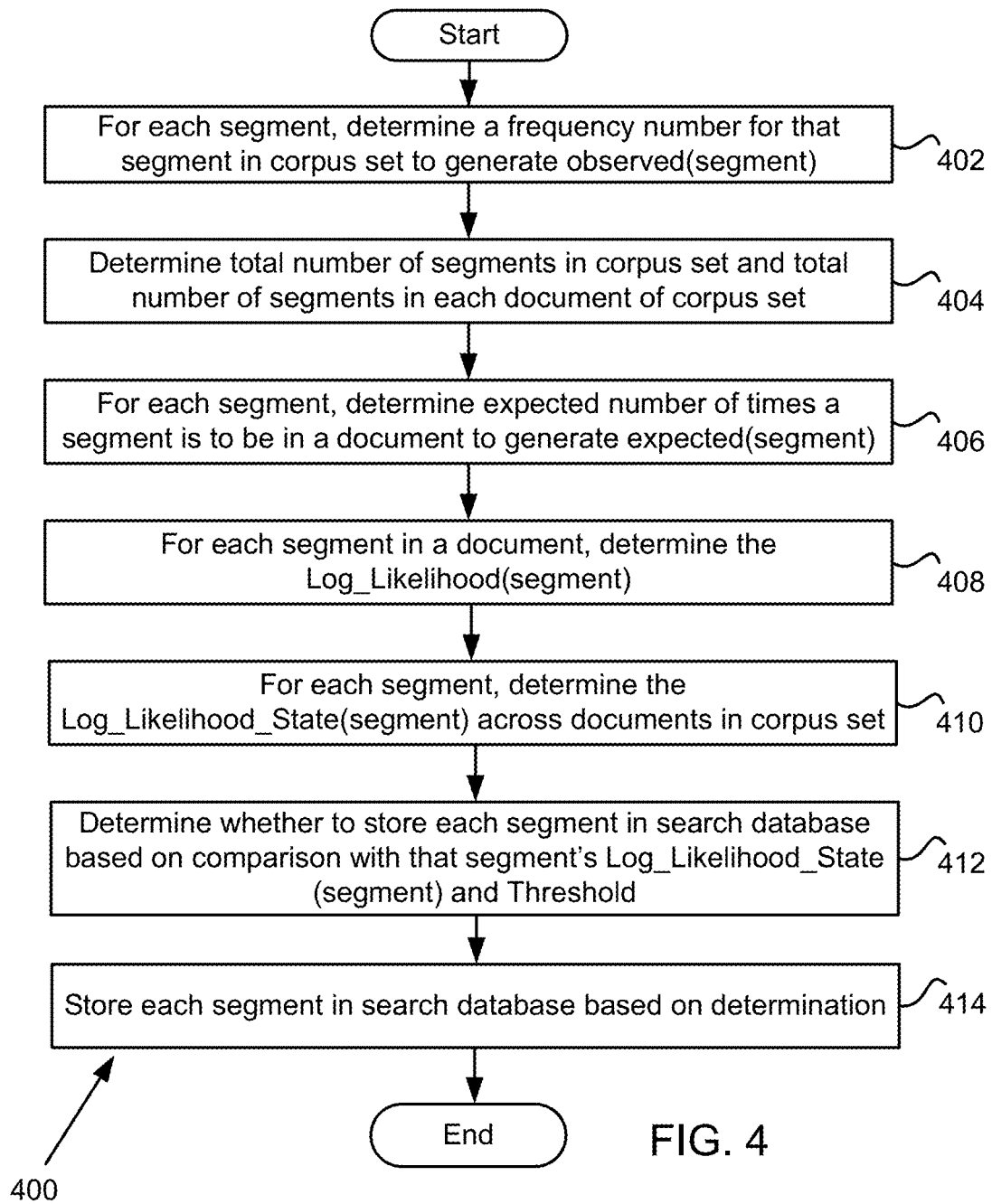
FIG. 4 is a flowchart for determining frequency statistics and determining segments of potential interest based on the frequency statistics in some embodiments.

FIG. 4 is a flowchart for determining frequency statistics and determining segments of potential interest based on the frequency statistics in some embodiments. In step 402, for each segment of a document identified or generated by the corpus module 202, the text selection module 204 determines a frequency number of that segment in the corpus set to generate observed(segment) value. For example, the observed(segment) may be the number of times that segment appears in the corpus set.

In step 404, the text selection module 204 determines the total number of segments in corpus set as well as the total number of segments in each document of the corpus set. In step 406, the text selection module 204, for each segment, determines an expected frequency number of that segment in a document to generate expected(segment) value. For example, the expected number of times a segment is to appear in a single document, identified as "e," is as follows:

$$\text{Expected(segment)} = e = \frac{\text{Total Number of Times Segment in Corpus}}{\text{Total Number of Segments in Corpus}}$$

(Total Number of Segments in a Document)

In step 408, for each segment in a document, the text selection module 204 determines the log likelihood frequency statistic (i.e., Log_Likelihood(segment)) for that segment. For example, the text selection module 204 may determine an observed number of times a phrase actually appears in a single document, identified by "o," as follows:

Observed(segment)=o=Total Number of Times segment Appears in Document

The log_likelihood(segment) (i.e., LL) is, for example, calculated using e and o as defined above as follows:

$$\text{Log\_Likelihood(segment)} =$$
$$LL = \text{Observed(segment)} \log\left(\frac{\text{Observed (segment)}}{\text{expected (segment)}}\right)$$

The LL of a segment (i.e., Log_Likelihood(segment)) may be compared to a likelihood threshold to determine if the segment should be included in the first set of text segments. The likelihood threshold may include any number of values, either positive or negative, to compare to the LL of a segment to determine if the segment appeared more often in the document than expected.

For example, the text selection module 204 may compare the LL of a segment to a first likelihood threshold that is a positive value to determine if the segment appears more often in the document than expected. Similarly, for example, the text selection module 204 may compare the LL of a segment to a second likelihood threshold that is a negative value to determine if the segment appears less often in the document than expected. Segments that appear more often than expected in a document and/or segments that appears less often in a document than expected may be identified as segments of potential interest and stored in the search database 222.

In some embodiments, only segments that appear more often than expected in a document may be identified as segments of potential interest and stored in the search database 222. In some implementations, the LL function may include a maximum function to direct the value of a segment that appears less often in a document than expected to zero. This LL function, identified below as Log_Likelihood_Max(segment), may be defined as follows:

$$\text{Log\_Likelihood\_Max(segment)} =$$
$$\text{Max}\left(\text{Observed(segment)} \log\left(\frac{\text{Observed (segment)}}{\text{expected (segment)}}\right), 0\right)$$

The Log_Likelihood_Max(segment) as defined above may be compared to a positive likelihood threshold to determine if a segment should be identified as a segment of potential interest and stored in the search database 222 based on whether the segment appears a sufficient number of times more than expected. It will be appreciated that the likelihood threshold may be adjusted depending on a sensitivity regarding how much more or less a segment is expected to appear in a document before qualifying as a segment of potential interest.

In some embodiments, rather than comparing the Log_Likelihood_Max(segment) to the positive likelihood threshold, the LL or the Log_Likelihood_Max(segment) as described herein may be used in the calculation of a Log_Likelihood_State(segment). The Log_Likelihood_State(segment) may be utilized to determine if the segment is a segment of potential interest.

In step 410, the text selection module 204 determines, for each segment, the Log_Likelihood_State(segment). In general, the Log_Likelihood_State(segment) may be calculated based on at least some segments (e.g., potentially all segments) across any number of documents in the corpus set. The Log_Likelihood_State(segment) may be defined as follows:

$$\text{Log\_Likelihood\_State(segment)} = \sum_{\text{Documents}} (\text{Log\_Likelihood(segment)})^2$$

For example, for each segment in a document, the text selection module 204 may determine the LL and/or Log_Likelihood_Max(segment) for a segment in all documents. Subsequently, the text selection module 204 may square the LL and/or Log_Likelihood_Max(segment) of that particular segment for each particular document and add together the scores to generate the Log_Likelihood_State (segment) for that particular segment. As a result, the text selection module 204 may generate a set of Log_Likelihood_State(segment) scores for these segments (e.g., all segments) across any number of documents in the corpus set.

In step 412, each of the set of Log_Likelihood_State (segment) scores may be compared to a likelihood state threshold to determine if each related segment should be identified as a segment of potential interest and included in the search database 222 in step 414. For example, if a Log_Likelihood_State(segment) score of a first segment occurs an unexpectedly large number of times across many documents of the corpus set and that Log_Likelihood_State (segment) score is greater than the likelihood state threshold, that first segment may be identified as a segment of potential interest. If a Log_Likelihood_State(segment) score of a second segment occurs few times across many documents of the corpus and that Log_Likelihood_State(segment) score is less than the likelihood state threshold, the second segment may not be identified as a segment of potential interest.

Although this example illustrates utilizing likelihood functions to determine which segments to identify as segments of potential interest, in some embodiments, the Log_Likelihood_State(segment) may be compared to a likelihood state threshold to determine if the segment should be removed from search database as a segment that is no longer of potential interest.

FIG. 5 is a flowchart for partitioning search results in some embodiments. In step 502, the partition module 212 may select a number of documents from search results to generate the guide set of documents. The partition module 212 may select the documents at random or in any manner. For example, the partition module 212 may utilize a size function based on distances between documents to determine if there a set of documents that are close (e.g., a large number of documents with short distances between them) thereby identifying potentially dense areas. The partition module 212 may select any number of documents to include in the guide set based on the distances or in any other manner.

The partition module 212 may select any number of documents. The number of documents selected for the guide set may be predetermined (e.g., 8). In some embodiments, the partition module 212 may determine the number of documents in search results and determine a number of documents to select from the guide set based on the number of documents in the search results. The partition module 212 may determine the number of documents to select in the guide set in any number of ways.

In step 504, the partition module 212 retrieves distances between each document in search results and each document in guide set from search database 222. For example, for each document stored in the search database 222, the search database 222 may store calculated distances between that document and all other documents of the corpus set. The partition module 212 may retrieve distances between a first document and all other documents of the guide set (e.g., potentially not retrieving distances between the first document and other documents of the search results that are not in the guide set).

In step 506, the partition module 212, for each document in the search results, identifies at least one of the closest documents in the guide set based on the retrieved distances to form a plurality of partitions of documents of the search results. For example, once the partition module 212 identifies a document in the guide set that is closest to a first document (e.g., the first document not being in the guide set but being in the search results). A partition may be created that includes at least the identified document in the guide set that is closest to the first document. Any number of partitions may be created. In some embodiments, each partition may include at least one document from the guide set. Each document in a guide set may be exclusive to one partition.

Figure 7:
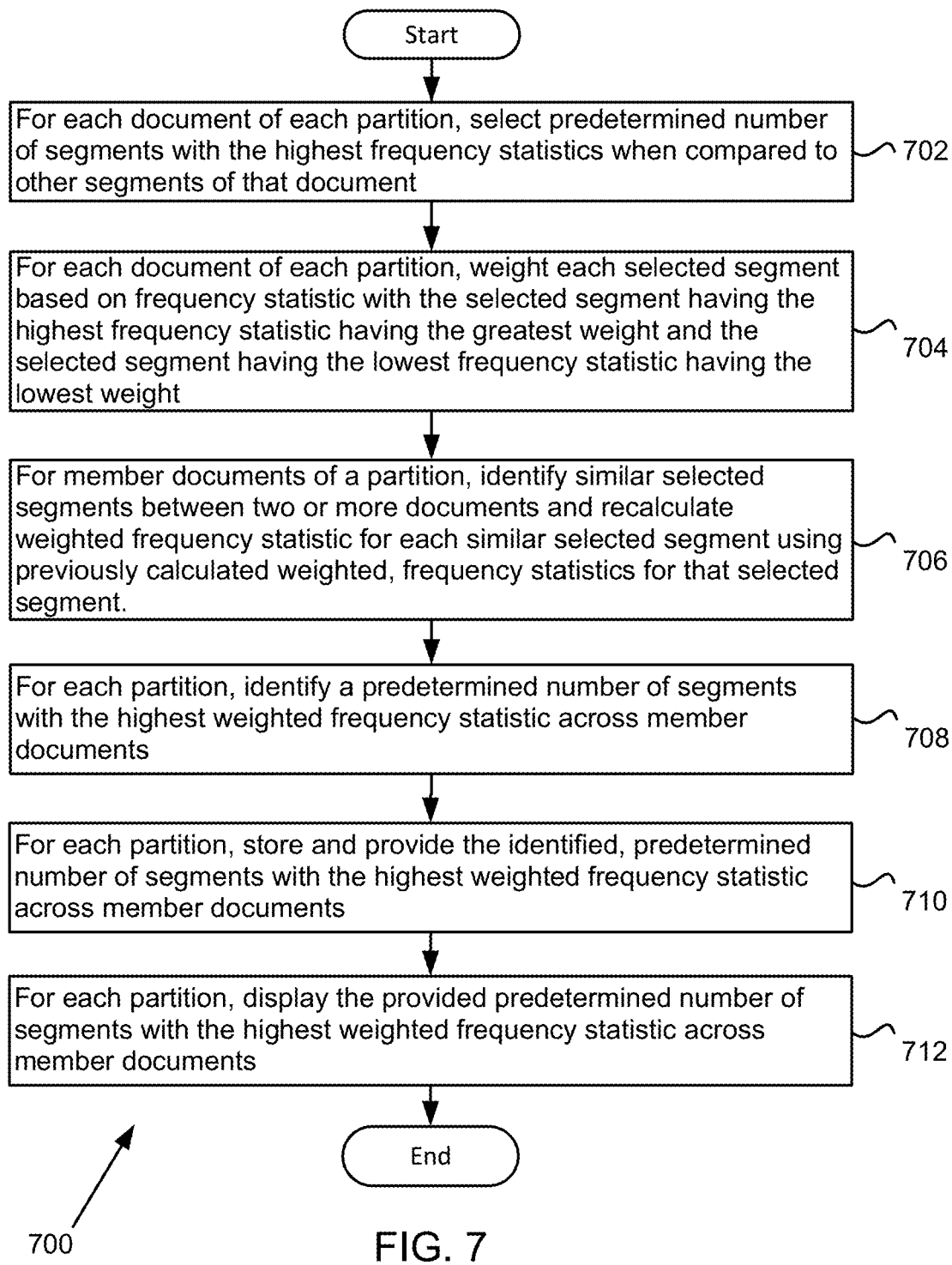
FIG. 7 is a flowchart for generating labels associated with segments of potential interest of document members of a partition using a frequency statistic in some embodiments.

It will be appreciated that FIG. 5 may stop and partitions created for the label module 214 to identify labels for each partition, the labels being associated with segments of high frequency in the documents for that partition (as described in FIG. 7).

Steps 508-514 may be utilized to improve partitions by removing some partitions with few member documents and splitting partitions for sets that have a large number of member documents.

In step 508, the partition module 212 determines a number of documents in each partition. In step 510, the partition module 212 may determine if the number of documents for any partition is less than a partition size threshold (e.g., if a partition has only two document members and the minimum partition size threshold is five). The partition size threshold may be predetermined or determined in any number of ways. In some embodiments, the partition module 212 determines the partition size threshold based on the number of documents in the search results and/or a distribution of distances of the documents in the search results.

If the number of documents in a partition is less than the partition size threshold, in step 512 the partition module 212 removes any documents that are members of the partition from the guide set. For example, if there is one document in a partition that is a member of the guide set, the partition module 212 will remove that document from the guide set.

In step 514, for each document removed from the guide set, the partition module 212 may select a document of a partition with a large number of document members to include in the guide set. The partition module 212 may identify partitions with a large number of document members in any number of ways. For example, the partition module 212 may identify the partition with the largest number of document members.

The method may return to step 504 and the process may continue as depicted whereby the partition module 212 may retrieve distances between each document in the search result and each document in the altered guide set to create new partitions.

In some embodiments, the partition module 212 may track the number of times any or all of steps 508-514 are performed. If the partition module 212 generates new partitions based on partitions with insufficient members too many times (e.g., the tracked number of iterations of steps 508-514 equals or exceeds an iteration threshold), the process may end.

Figure 6A:
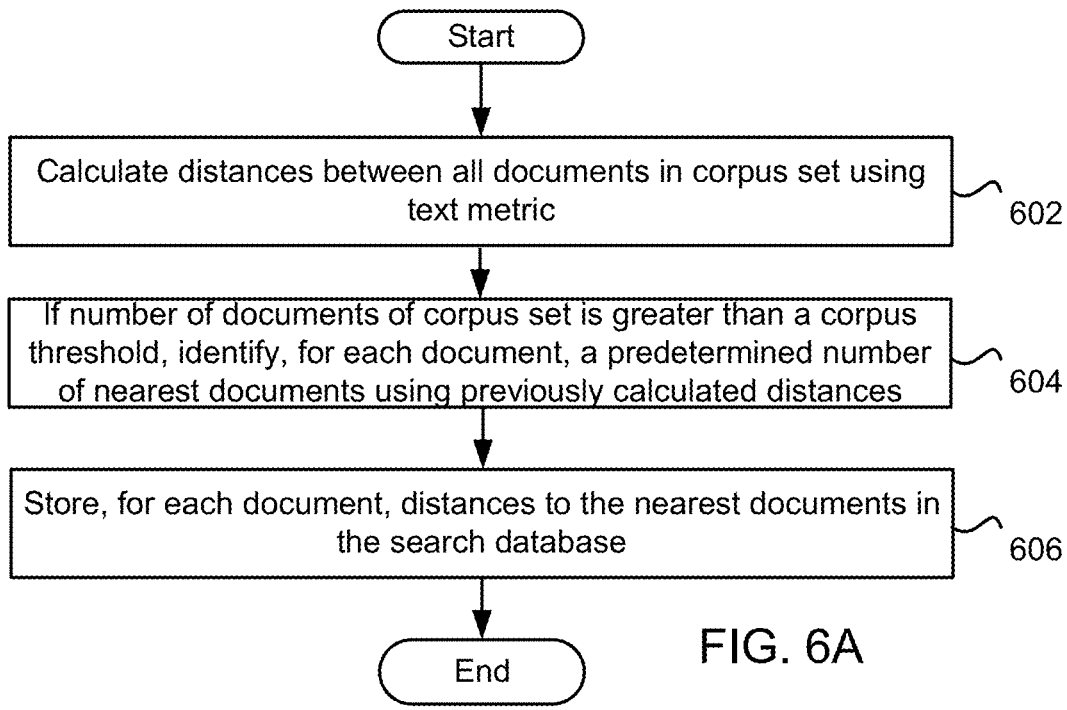
FIG. 6A and 6B depict other flowcharts for partitioning search results in some embodiments.
Figure 6B:
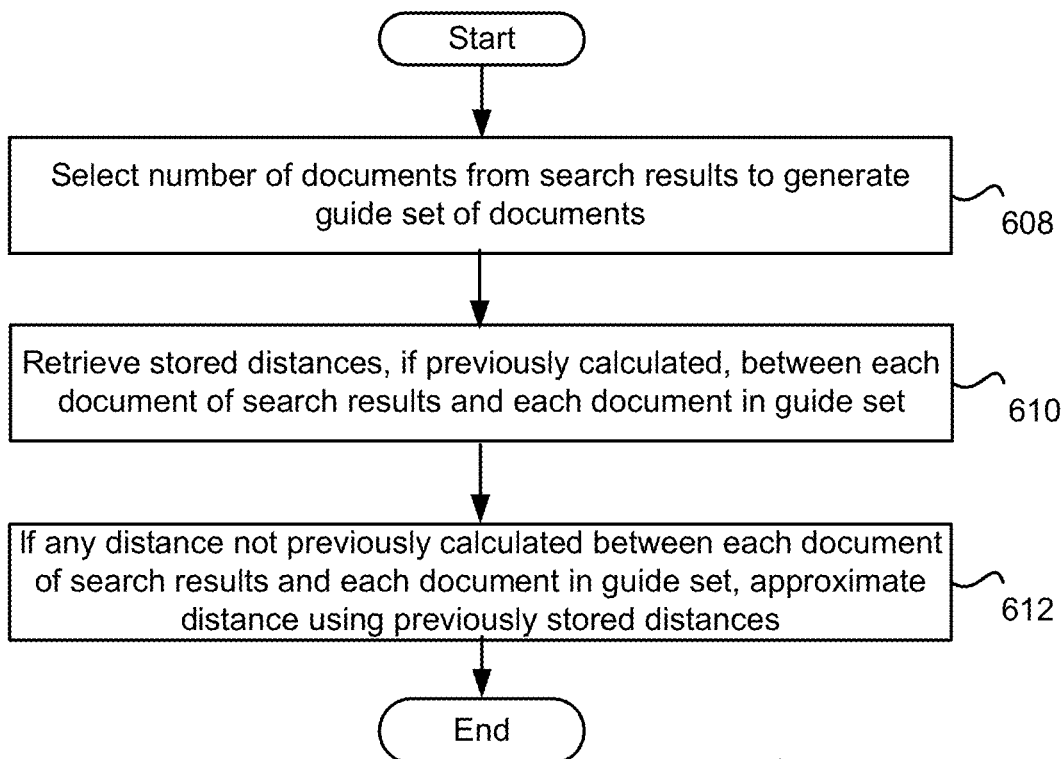

FIG. 6A and 6B depict other flowcharts for partitioning search results in some embodiments. In some embodiments, the search database module 208 may store only some of the distances between documents calculated by the distance module 206 (e.g., for reasons of speed or memory efficiency depending on the size of the corpus set). As a result, the partition module 212 may not be able to retrieve distances between documents in search result set and guide sets. In some embodiments, the partition module 212 may approximate distances if distances between documents in the search results and documents in the guide set are not available in the search database 222.

FIG. 6A depicts a flowchart for a process in which the text analysis system 104 determines to store fewer than all distance calculations in the search database 222 in some embodiments. In some embodiments, the text analysis system 104 may store the distances between each document and a collection of that document's nearest neighbors (e.g., 200 nearest neighbors).

In step 602, the distance module 206 calculates distances between all documents in corpus set using text metric as discussed herein. In step 604, if the number of documents in the corpus set is greater than a corpus threshold, the distance module 206 may identify, for each document, a predetermined number of nearest documents using the calculated distances. For example, for each document in the corpus, the distance module 206 may determine the closest 20 documents based on the previously calculated distances.

In step 606, the search database module 208 may store, for each document, those distances to the identified nearest documents in the search database 222. In some embodiments, the search database 222 may include, for each document, distance calculated between that document and a predetermined number of nearest documents. Other distances may not be stored.

Since not all distances may be stored, the partition module 212 may be required to approximate distances to form partitions as shown in FIG. 6B. For example, in step 608, the partition module 212 may select a number of documents from search results to generate guide set of documents as described herein.

In step 610, the partition module 212 may retrieve stored distances, if previously calculated, between each document of search results and each document in guide set. If the distance between a document in a search result and a document in the guide set has not been stored, then the partition module 212 and/or the distance module 206 may approximate the distance between the document in the search result and the document in the guide set in step 612.

In some embodiments, the partition module 212 may utilize distances between any number of documents that form a path from the initial document that is the starting point to the document in the guide set. In one example, if the particular document of the search results and the particular document of the guide set are part of a connected graph (e.g., connected based on distances calculated by the distance module 206), the partition module 212 may use Dijkstra's algorithm to approximate the distance. The approximation may then be utilized in place of retrieving distances from the search database 222. If all distances between each document in the search results and each document in the guide set are retrieved or approximated, the process may continue in step 506 in FIG. 5.

FIG. 7 is a flowchart for generating labels associated with segments of potential interest of document members of a partition using a frequency statistic in some embodiments. In step 702, for each document of each partition, the label module 214 selects a predetermined number of segments with the highest frequency statistics when compared to other segments of that document. For example, for each document of a partition, the label module 214 may identify a predetermined number of segments (e.g., 20) with the highest frequency statistics. In some embodiments, the text selection module 204 may calculate the frequency statistics for segments in a document and then may store the segments of potential interest corresponding to the highest frequency statistics (e.g., the top twenty segments of potential interest based on a likelihood function as described herein). In various embodiments, the text selection module 204 may order the segments of potential interest based on frequency statistic and save the segments in that order. The label module 214 may retrieve those segments of potential interest in step 702.

In step 704, for each document of each partition, the label module 214 weights each selected segment based on frequency statistic with the selected segment having the highest frequency statistic having the greatest weight and the selected segment having the lowest frequency statistic having the lowest weight. It will be appreciated that the segments of potential interest may be weighted in any number of ways.

In step 706, for member documents of a partition, the label module 214 identifies similar selected segments between two or more documents and recalculates weighted frequency statistic for each similar selected segment using previously calculated weighted, frequency statistics for that selected segment. For example, if two or more documents identify the "synchrocyclotron" as a top segment of potential interest, the label module 214 may combine the weighted, frequency statistic from both documents and recalculate a new weighted frequency statistic (e.g., the new weighted, frequency statistic of the segment of potential interest being significantly larger than the two previous weighted frequency statistics associated with the previous documents).

In step 708, for each partition, the label module 214 identifies a predetermined number of segments with the highest weighted frequency statistic across all member documents of that partition. For example, the label module 214 may select the top 10 segments with the highest weighted frequency statistic across all member documents of that partition.

In step 710, for each partition, the label module 214 stores (e.g., in the search database 222) and provides the identified, predetermined number of segments with the highest weighted frequency statistic across member documents. The provided segments may be provided as labels to assist the user to better understand the search results and contents of documents.

In step 712, for each partition, the label module 214 or the client device 106 may display the provided predetermined number of segments with the highest weighted frequency statistic across member documents. The display is shown in screenshots of exemplary interfaces herein.

FIG. 8 is a flowchart for restricting a set of documents in some embodiments. In step 802, the restriction module 216 receives a restricted selection of documents. For example, a user may select one or more partitions and/or one or more documents. The selection may represent a subset of the set of documents the user is exploring using the search client module 108. The previous state (e.g., the previous set of documents) of the documents being explored by the user may be the initial search results and/or the result of any restrictions and/or expansions as described with regard to FIGS. 8 and 9.

In step 804, the restriction module 216 identifies documents of restricted selection. In some embodiments, the restricted selection may identify segments of potential interest, labels, metadata, and/or any other data. The restriction module 216 may identify related documents based on information of the restriction.

In step 806, the partition module 212 may, for each document identified based on the restricted selection, partition documents using text metric (e.g., based on calculated distances) as described with respect to the partition module 212 and FIGS. 3-5 herein.

In step 808, for each partition of restricted search results, the label module 214 may determine labels of member documents to identify at least some segments of potential interest using frequency statistic as described with respect to the label module 214 and FIG. 7 herein.

In step 810, for each partition, the search module 210, label module 214, restriction module 216, and/or user device may display or assist in displaying features of member documents (e.g., a graph or other information), labels from the label module 214, or any other information.

It will be appreciated that the user may further view information, including labels, associated with the restricted selection and may perform other functions (e.g., further restricting or expanding the new output) using the documents associated with the restricted selection or perform a new search on the same or different documents.

FIG. 9 is a flowchart for receiving an expanded selection in some embodiments. In step 902, the expand module 218 may receive an expanded selection identifying selected documents. As similarly discussed regarding a restricted selection, the expanded selection may represent a subset of the set of documents the user is exploring using the search client module 108. The previous state (e.g., the previous set of documents) of the documents being explored by the user may be the initial search results and/or the result of any restrictions and/or expansions as described with regard to FIGS. 8 and 9.

In step 904, the expand module 218 may receive an expanded selection, identify documents associated with the expanded selection, and determine the nearest neighbors of documents in the corpus set to documents in the expanded selection. For example, the expand module 218 may identify documents associated with expanded selection (e.g., either by document identifier or by identify documents related to selected labels, segments of potential interest, or any other information). The expand module 218 may determine a number of nearest neighbors (e.g., 20) of nearest neighbor documents in the corpus set using the distances calculated by the distance module 206. The selected documents and the nearest neighbors may be included in an expanded selection set of documents in step 906.

In step 908, the partition module 212 may partition the expanded selection set of documents as described herein (see steps 502-506 in FIG. 5 for example). Further, in step 910, as similarly described, the label module 214 may generate labels using the expanded selection set of documents. In step 912, the search module 210 may provide the identifiers of the documents in the expanded selection set, new labels, and/or any other information to the client device 106.

Figure 10:
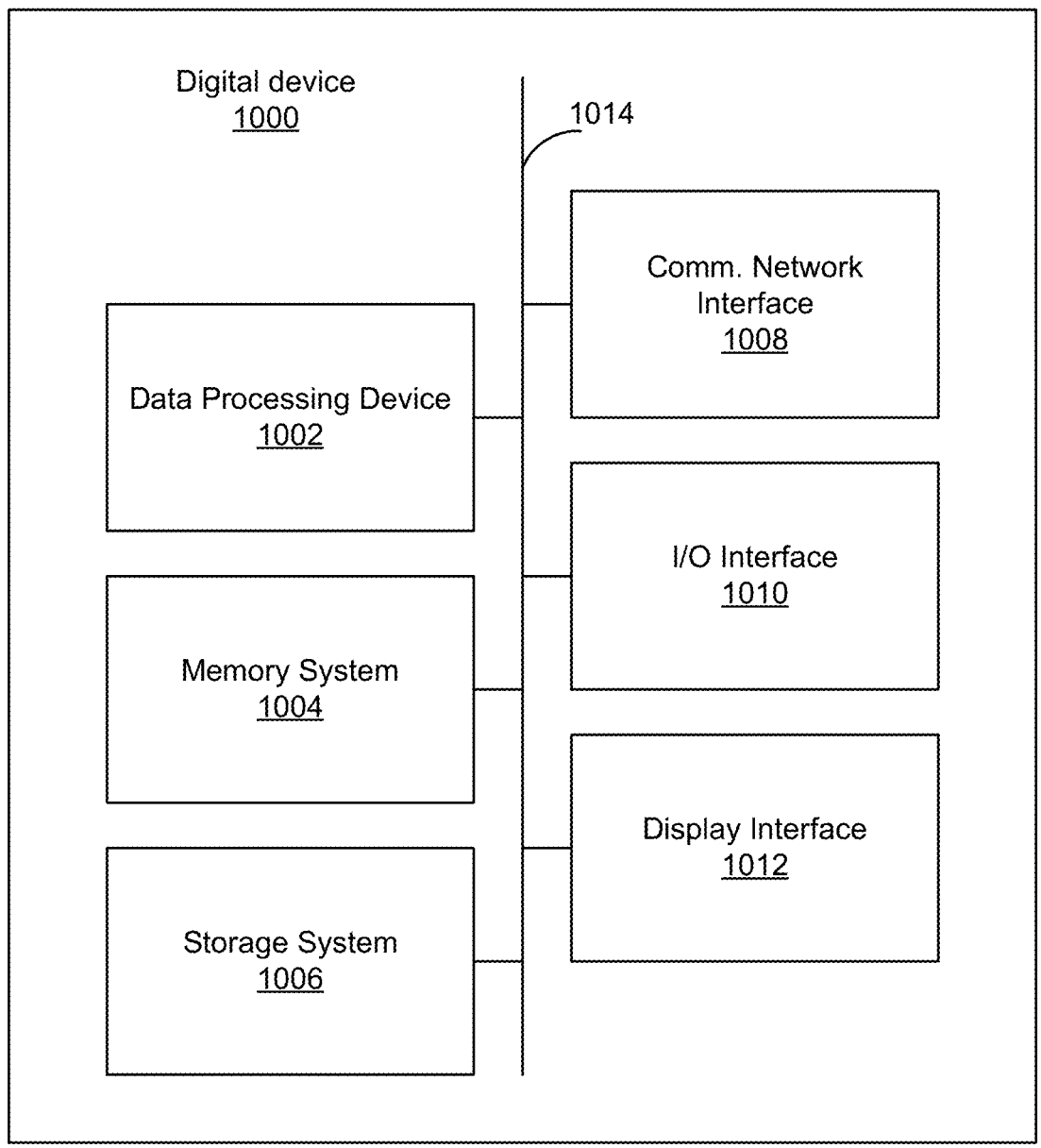
FIG. 10 is a functional block diagram of a digital device in some embodiments.

FIG. 10 is a functional block diagram of a digital device 1000 in some embodiments. The digital device 1000 includes a data processing device 1002 (e.g., a processor), a memory system 1004 (e.g., non-transitory memory), a storage system 1006, a communication network interface 1008, an I/O interface 1010, and a display interface 1012 communicatively coupled to a bus 1014. The data processing device 1002 is in communication with the memory system 1004, the storage system 1006, the communication network interface 1008, the I/O interface 1010, and the display interface 1012. The data processing device 1002 is also configured to execute executable instructions (e.g., programs stored on the memory system 1004 or the storage system 1006). In some examples, the data processing device 1002 includes circuitry or any data processing device capable of processing the executable instructions.

The memory system 1004 is any non-transitory memory configured to store data. Some examples of the memory system 1004 are storage devices, such as RAM or ROM. The memory system 1004 can comprise the ram cache. The data within the memory system 1004 may be cleared or ultimately transferred to the storage system 1006.

The storage system 1006 is any storage configured to retrieve and store data. Some examples of the storage system 1006 are flash drives, hard drives, optical drives, and/or magnetic tape. The storage system 1006 may comprise non-transitory media. In some implementations, the digital device 1000 includes a memory system 1004 in the form of RAM and a storage system 1006 in the form of flash data. Both the memory system 1004 and the storage system 1006 include computer readable media which may store instructions or programs that are executable by a computer processor including the data processing device 1002.

The communication network interface (com. network interface) 1008 can be coupled to a network (e.g., network 110) via the link 1016. The communication network interface 1008 may support communication over an Ethernet connection, a serial connection, a parallel connection, or an ATA connection, for example. The communication network interface 1008 may also support wireless communication (e.g., 802.11 a/b/g/n, WiMax). Moreover, the communication network interface 1008 can support many wired and wireless standards.

The optional input/output (I/O) interface 1010 is any device that receives input from the user and output data. The optional display interface 1012 is any device that is configured to output graphics and data to a display. In some examples, the display interface 1012 is a graphics adapter. While not all digital devices include either the I/O interface 1010 or the display interface 1012, the digital device 1000 may include either, both, or none.

The hardware elements of the digital device 1000 are not limited to those depicted in FIG. 10. A digital device 1000 may comprise more or less hardware elements than those depicted. Further, hardware elements may share functionality and still be within various implementations described herein. In some examples, encoding and/or decoding may be performed by the data processing device 1002 and/or a co-processor located on a GPU (i.e., Nvidia).

Figure 11A:
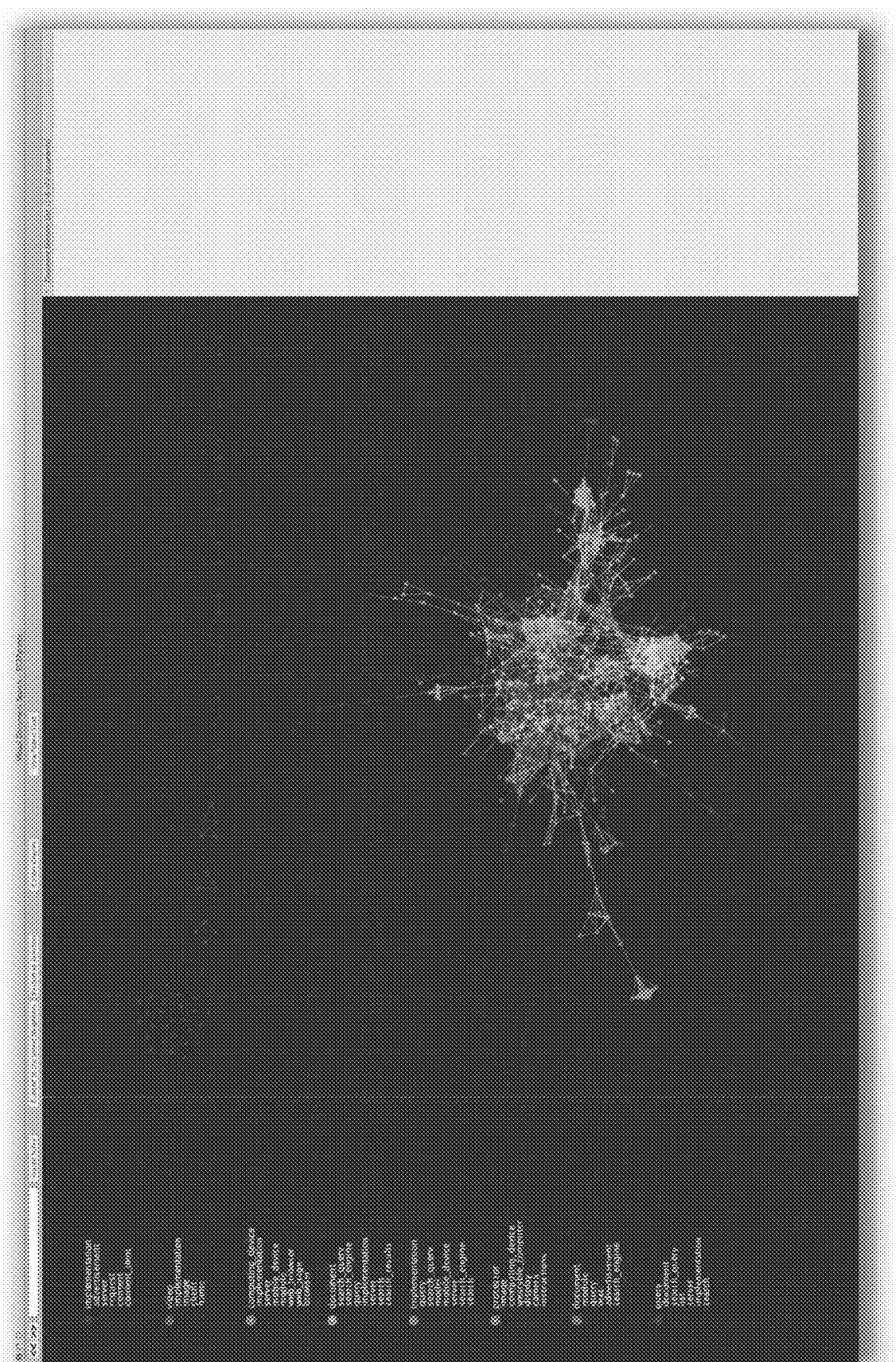
FIG. 11A is an interface depicting a graph of search results and labels for partitions of the graph in some embodiments.
Figure 11B:
FIG. 11B depicts the labels and partitions of FIG. 11A.
Figure 11C:
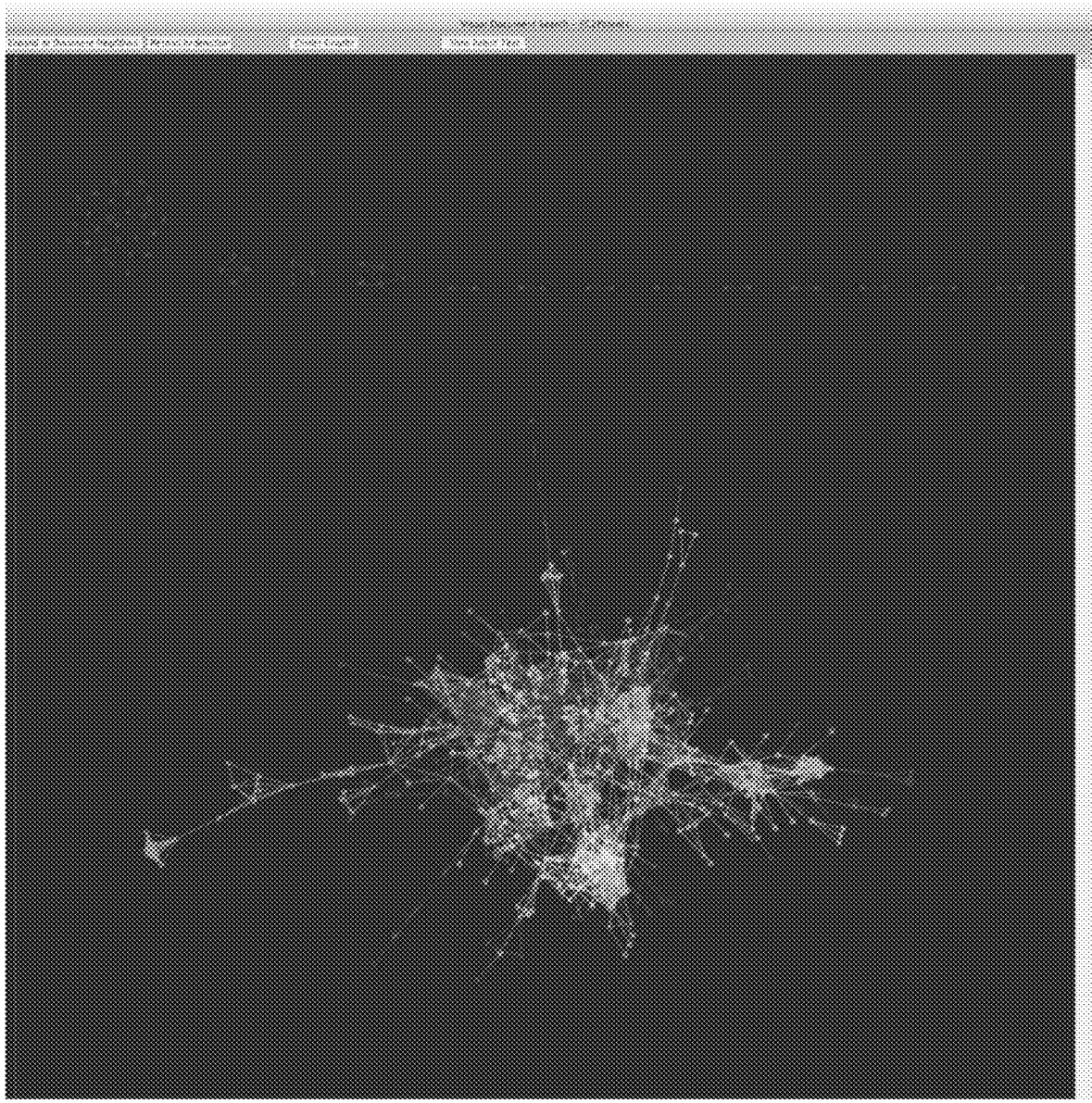
FIG. 11C depicts the graph of FIG. 11A.

FIG. 11A is an interface depicting a graph of search results and labels for partitions of the graph in some embodiments. FIG. 11B depicts the labels and partitions of FIG. 11A. FIG. 11C depicts the graph of FIG. 11A. The interface of FIG. 11A may be depicted on the client device 106 (e.g., via the search client module 108).

Figure 12A:
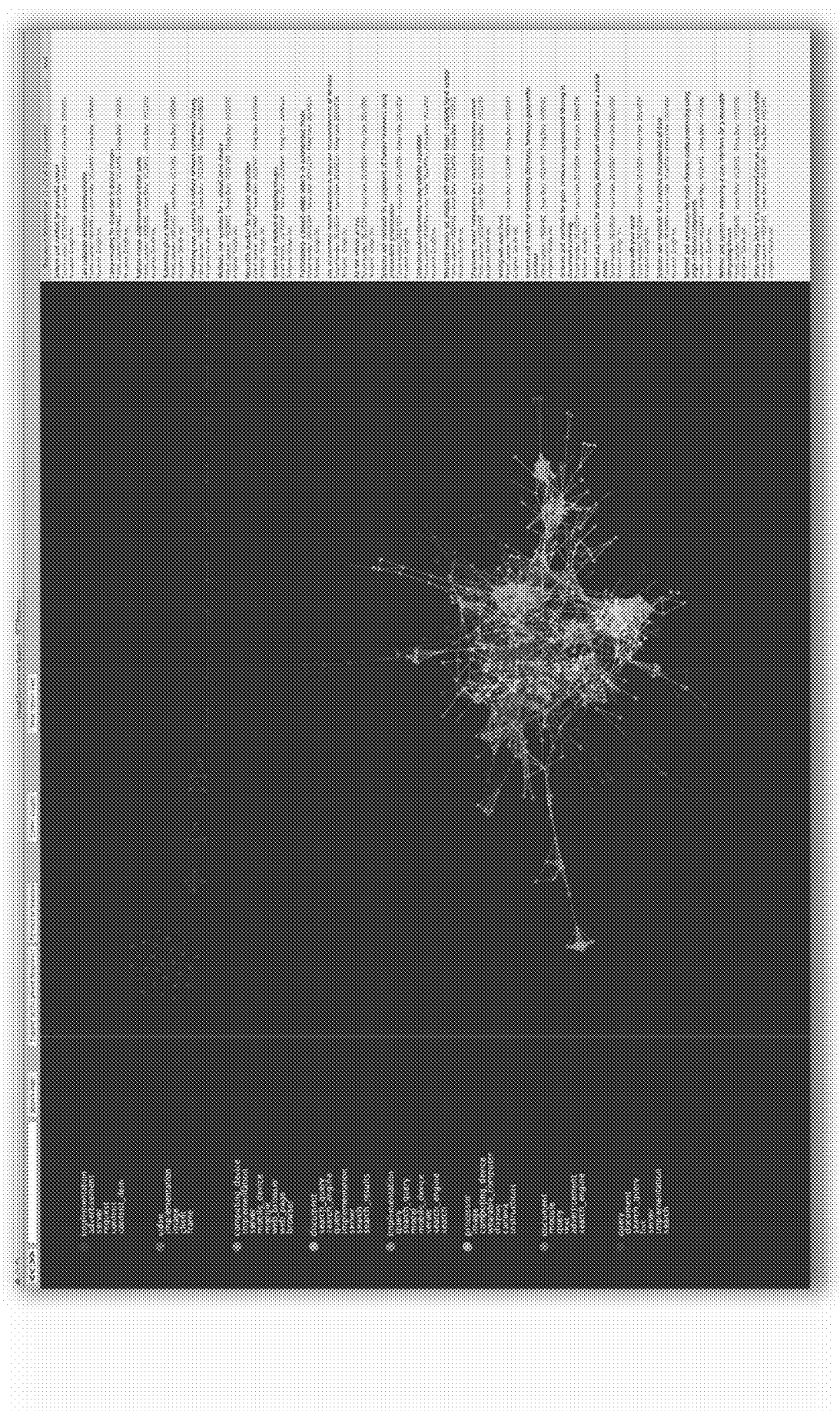
FIG. 12A is an interface whereby a user has selected a label (e.g., processor) and a document selection list was generated showing a list of documents including associated labels for each document in some embodiments.
Figure 12B:
FIG. 12B depicts labels and partitions of the graph including a selected partition.
Figure 12C:
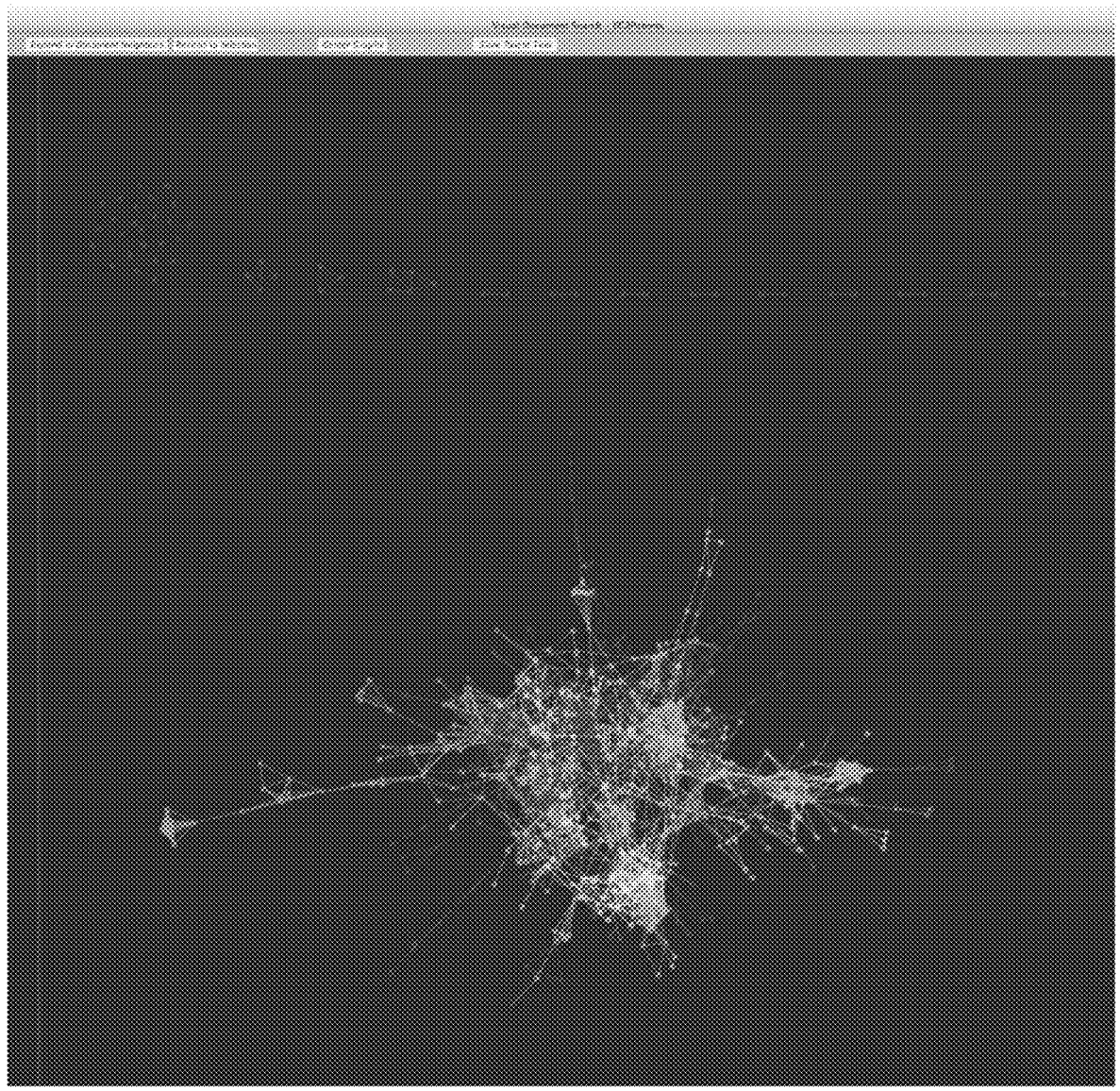
FIG. 12C depicts the graph of FIG. 12A.
Figure 12D:
FIG. 12D depicts the document selection list of FIG. 12A.

FIG. 12A is an interface whereby a user has selected a label (e.g., processor) and a document selection list was generated showing a list of documents including associated labels for each document in some embodiments. FIG. 12B depicts labels and partitions of the graph including a selected partition. FIG. 12C depicts the graph of FIG. 12A. FIG. 12D depicts the document selection list of FIG. 12A.

Figure 13A:
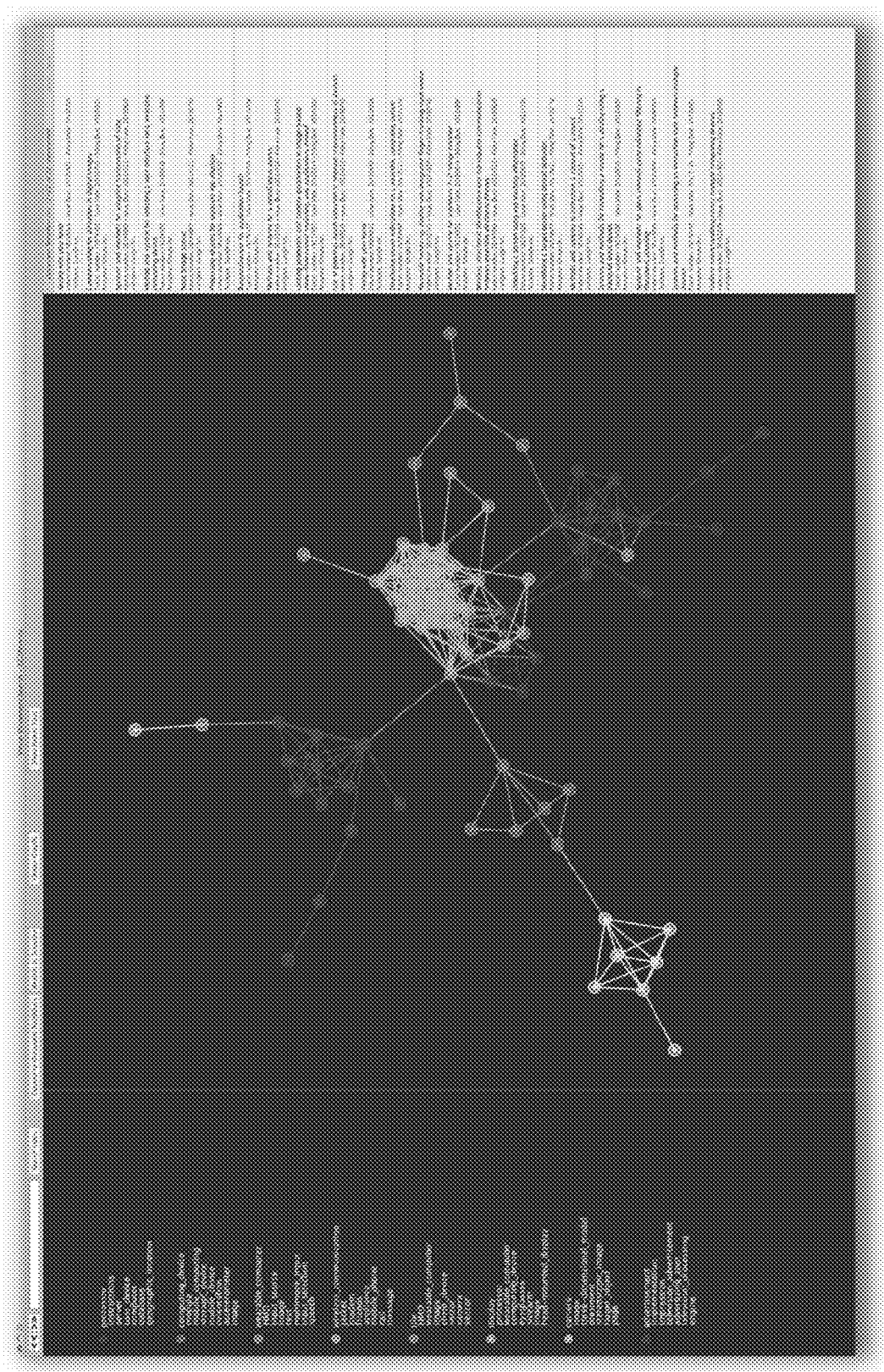
FIG. 13A is an interface depicting a restricted selection by the user in some embodiments.

FIG. 13A is an interface depicting a restricted selection by the user in some embodiments. For example, the user may have provided a restricted selection of documents related to a partition of the documents identified in FIGS. 11A and 12A. The client device 106 may depict a graph of the restricted selection of documents along with labels associated with partitions of the restricted selection. The user may have also selected two sets of labels for two partitions including "display" and "camera."

Figure 13B:
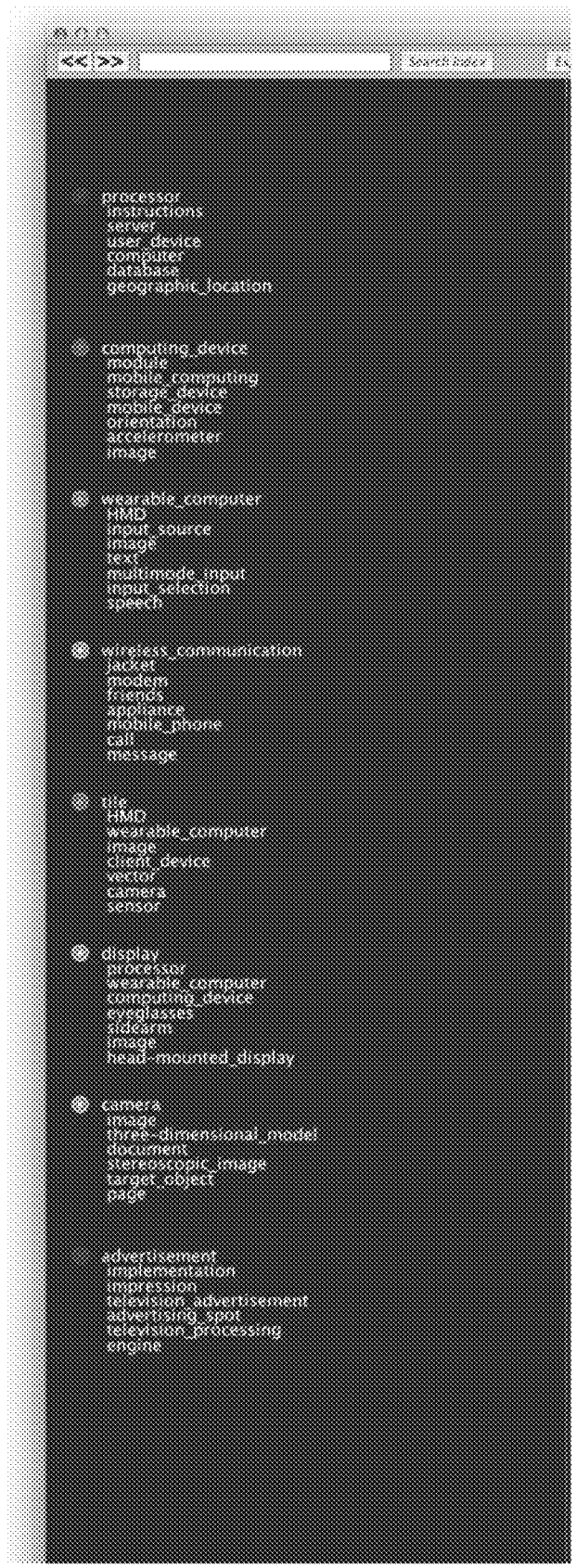
FIG. 13B depicts the labels and partitions of FIG. 13A.
Figure 13C:
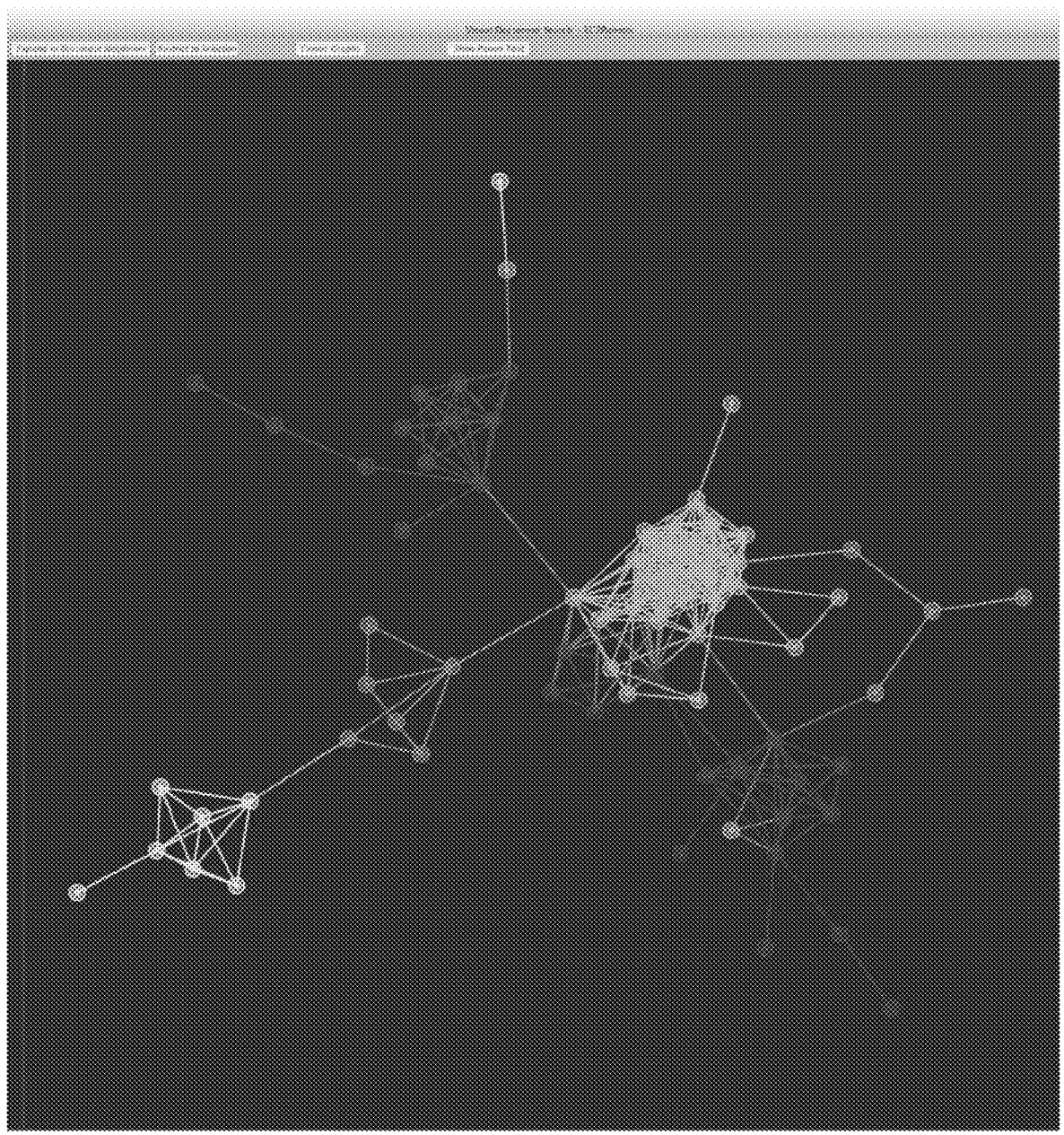
FIG. 13C depicts the graph of FIG. 13A.
Figure 13D:
FIG. 13D depicts the document selection list of FIG. 13A showing a document list associated with the two selected partitions.

FIG. 13B depicts the labels and partitions of FIG. 13A. FIG. 13C depicts the graph of FIG. 13A. FIG. 13D depicts the document selection list of FIG. 13A showing a document list associated with the two selected partitions.

Figure 14A:
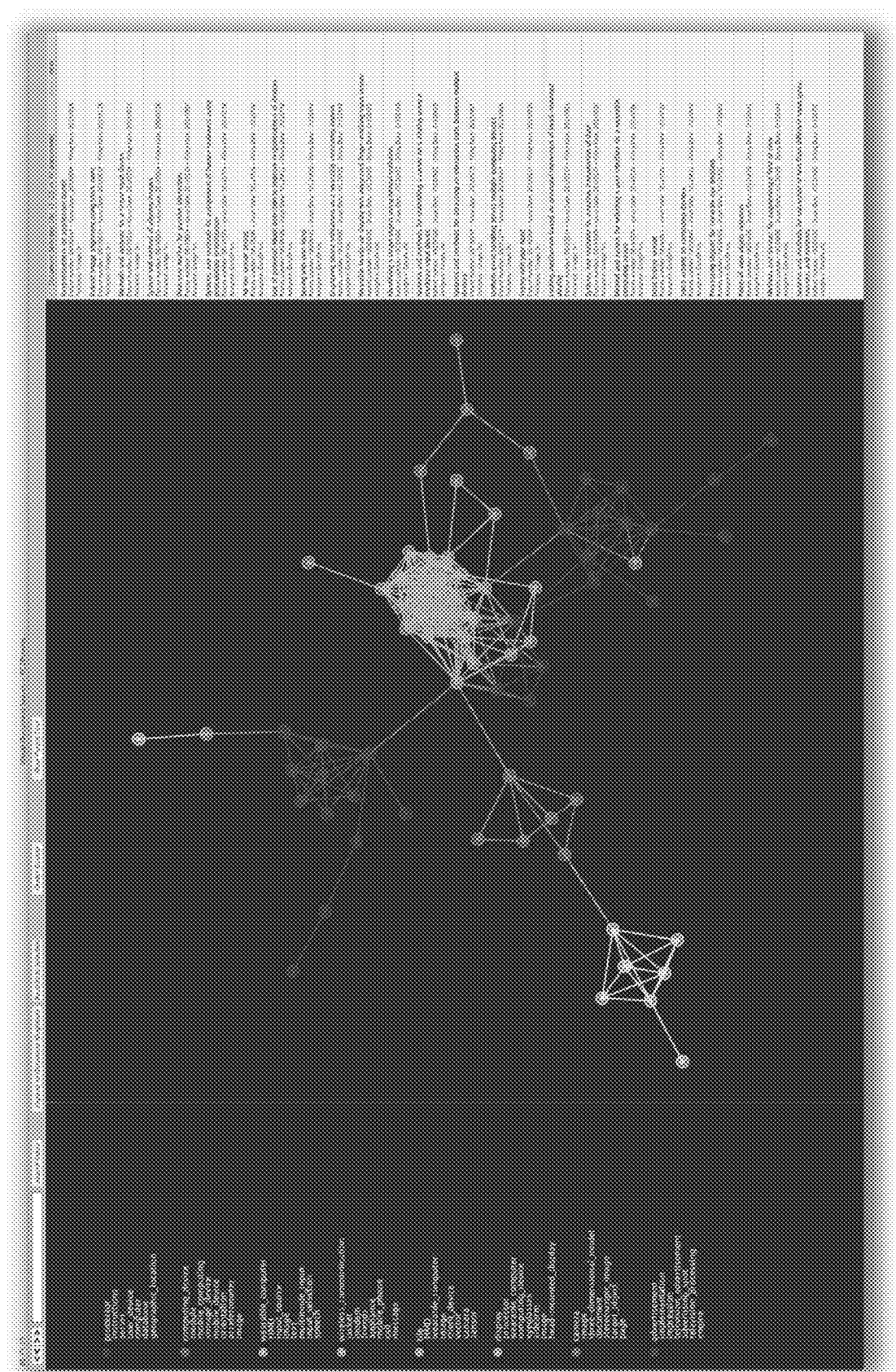
FIG. 14A is an interface depicting a selection of a partition associated with the label of "wearable_computer" by the user in some embodiments.
Figure 14B:
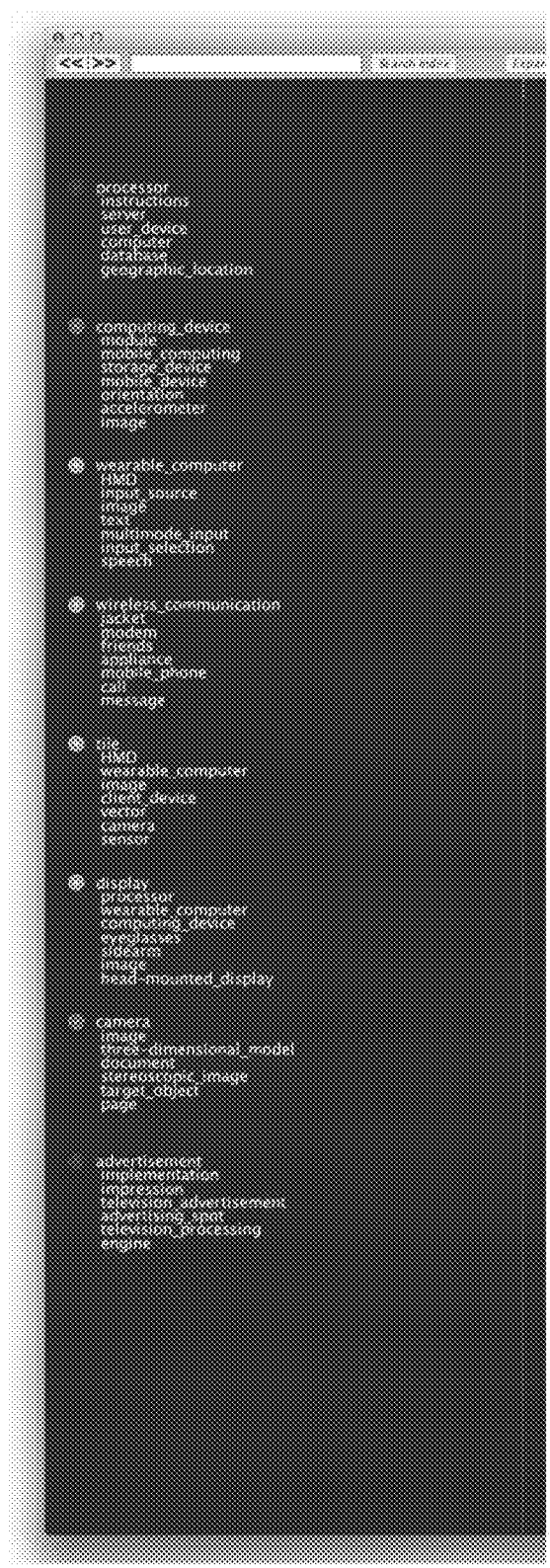
FIG. 14B depicts the labels and partitions of FIG. 14A.
Figure 14C:
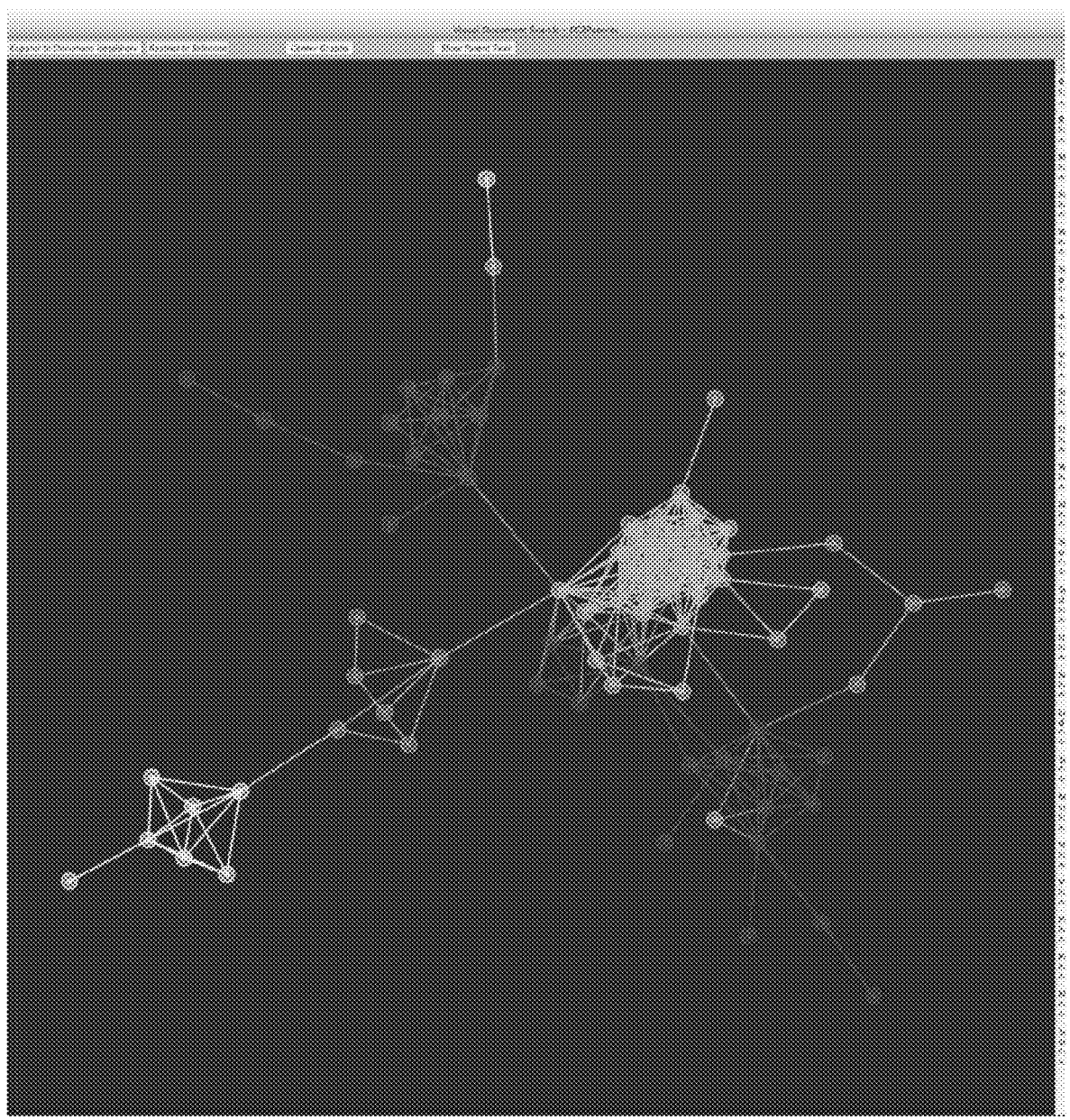
FIG. 14C depicts the graph of FIG. 14A.
Figure 14D:
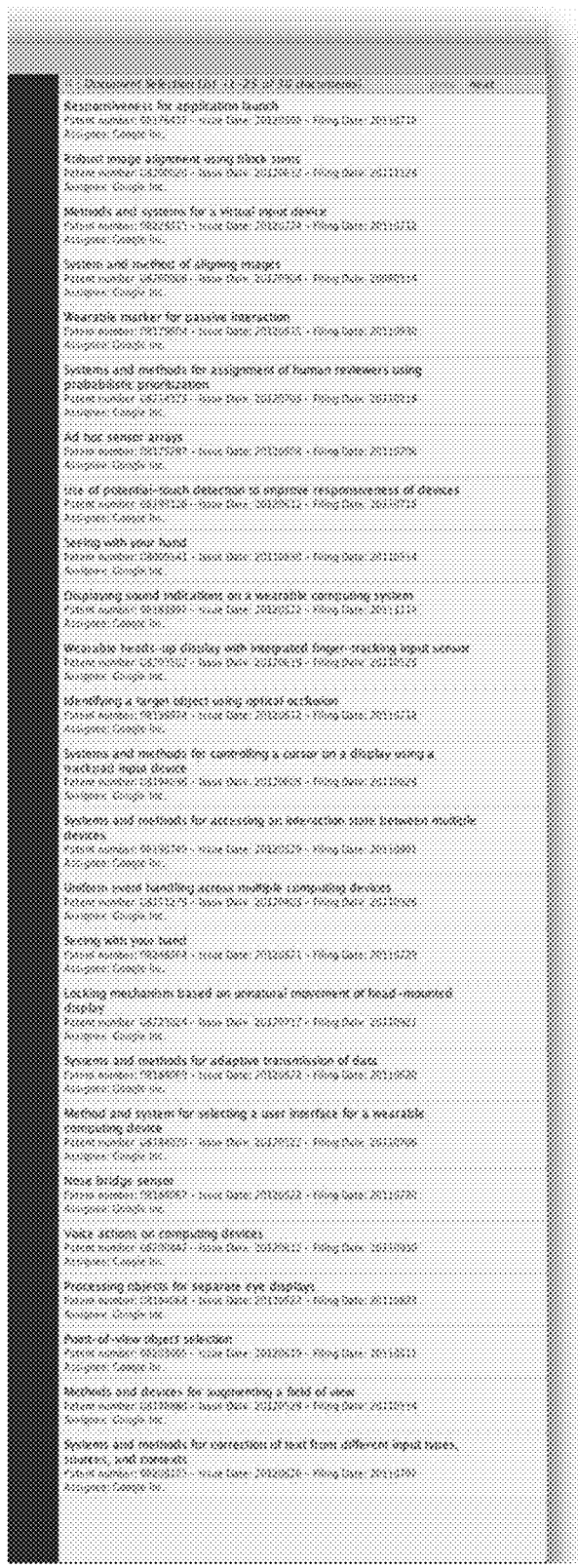
FIG. 14D depicts the document selection list of FIG. 14A showing a document list associated with the selected partitions
Figure 15A:
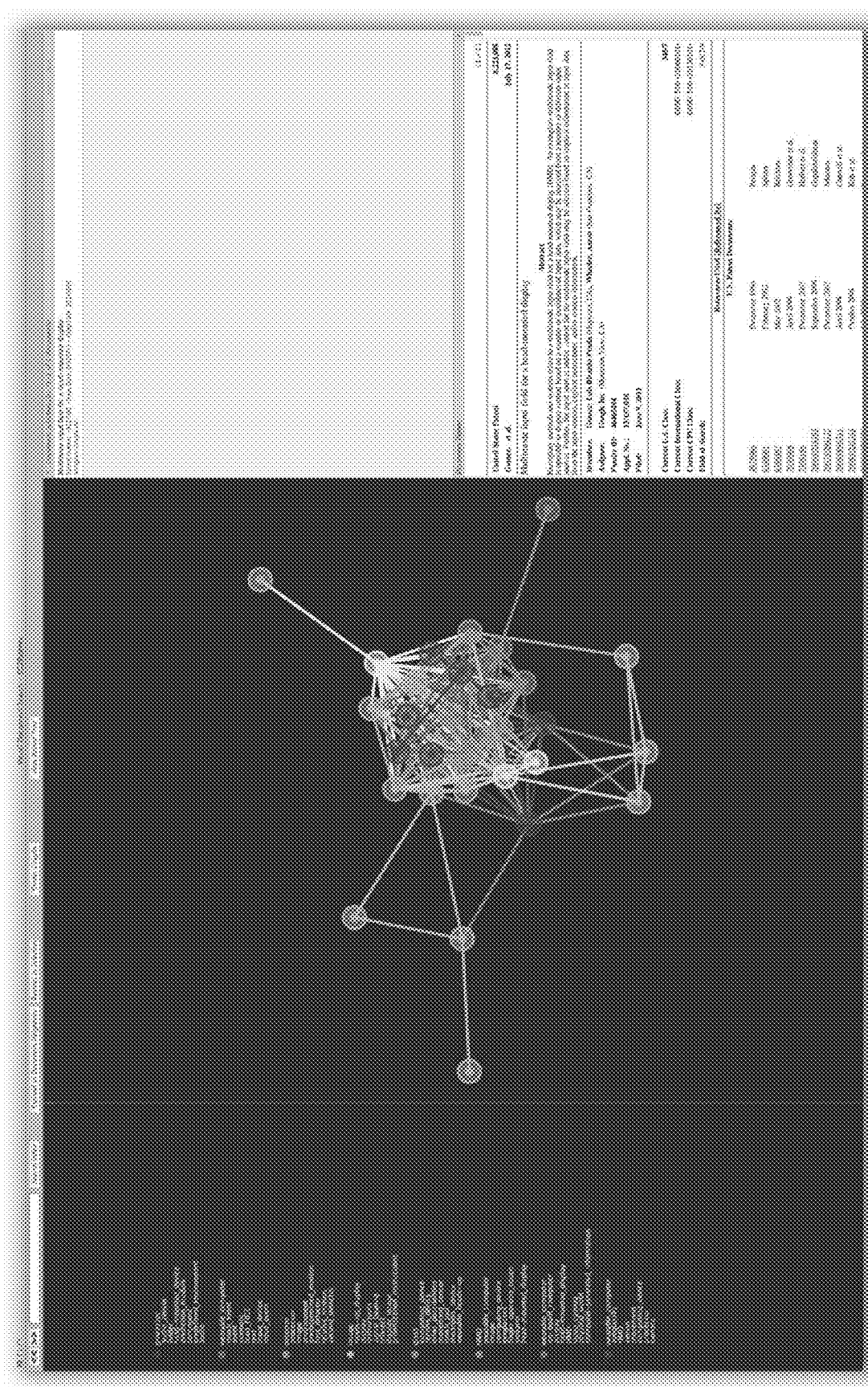
FIG. 15A is an interface of an expanded selection of the "wearable_computer" partition by the user in some embodiments.

FIG. 14A is an interface depicting a selection of a partition associated with the label of "wearable_computer" by the user in some embodiments. FIG. 14B depicts the labels and partitions of FIG. 14A. FIG. 14C depicts the graph of FIG. 14A. FIG. 14D depicts the document selection list of FIG. 14A showing a document list associated with the selected partitions FIG. 15A is an interface of an expanded selection of the "wearable_computer" partition by the user in some embodiments. FIG. 15A depicts a new graph and partitions based on the expanded selection (the process of which is described herein. The graph of FIG. 15A depicts a user selection of a node (e.g., a document) and the selected document is displayed.

Figure 15B:
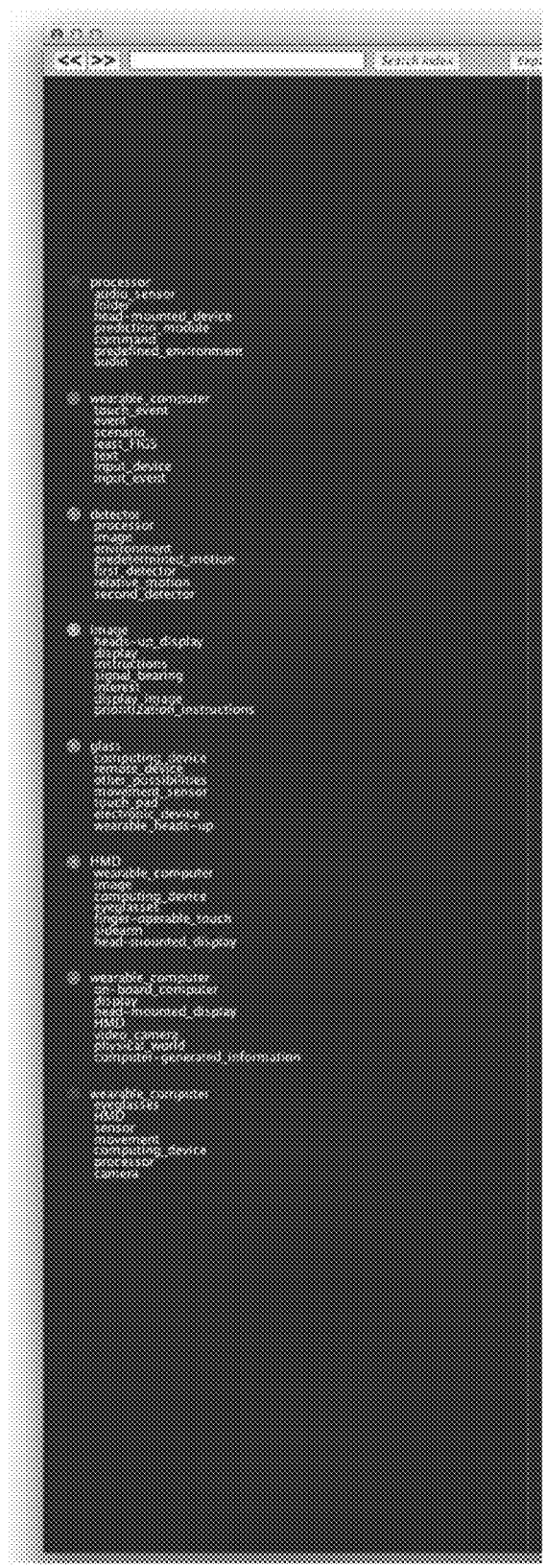
FIG. 15B depicts the labels and partitions of FIG. 15A.
Figure 15C:
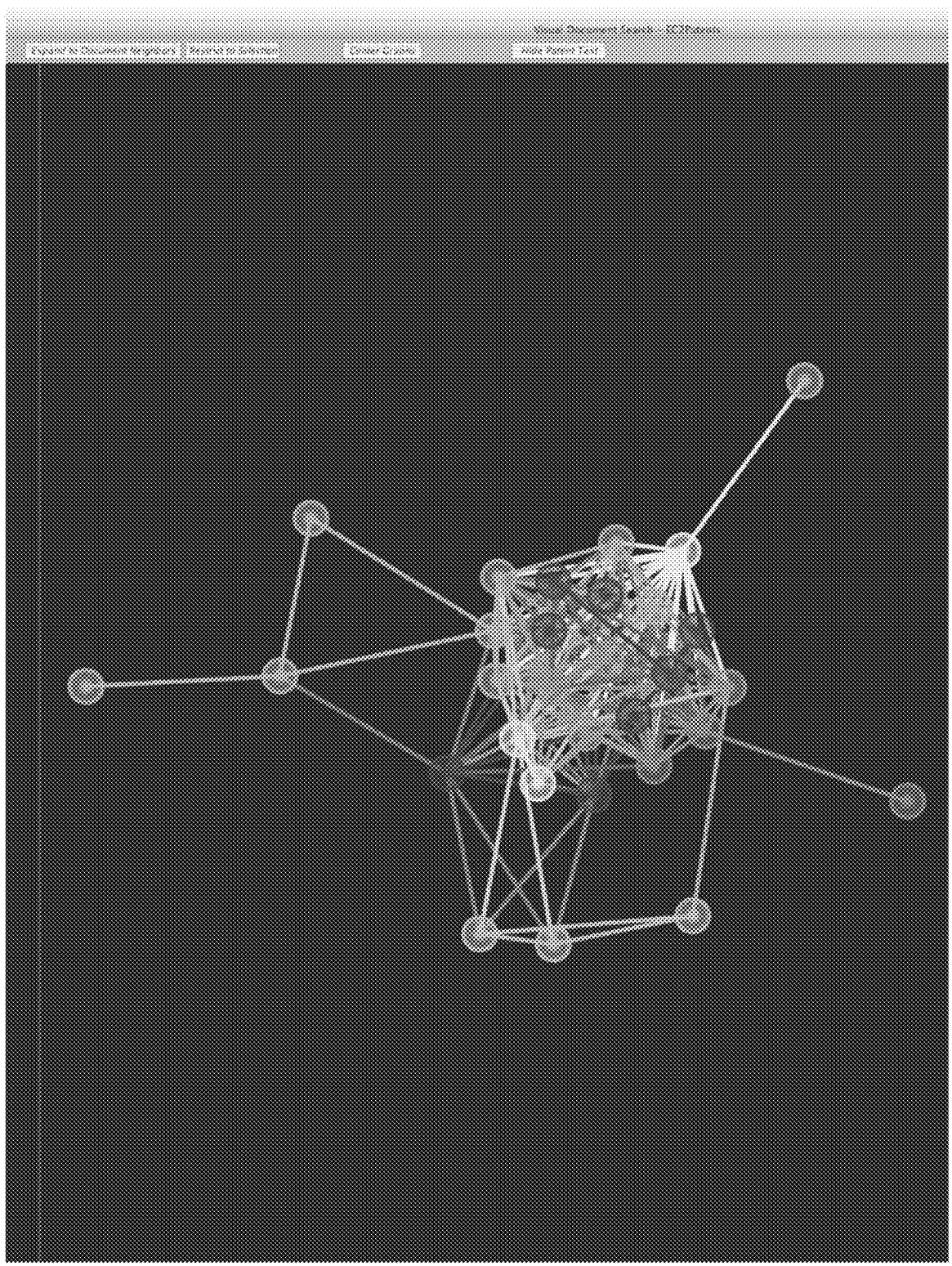
FIG. 15C depicts the graph of FIG. 15A.
Figure 15D:
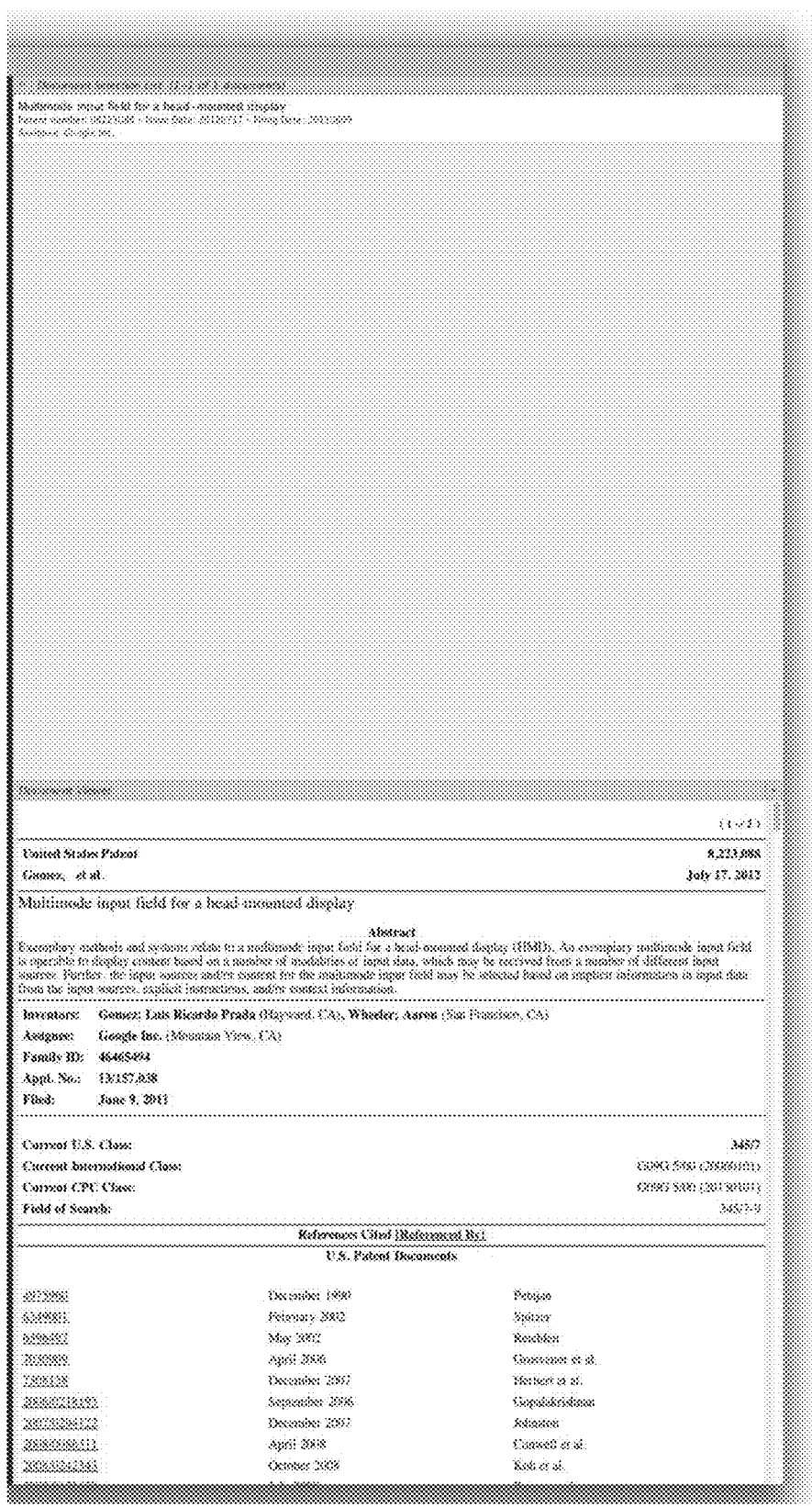
FIG. 15D depicts the selected document of FIG. 15A.

FIG. 15B depicts the labels and partitions of FIG. 15A. FIG. 15C depicts the graph of FIG. 15A. FIG. 15D depicts the selected document of FIG. 15A.

The above-described functions and components can be comprised of instructions that are stored on a storage medium such as a computer readable medium (e.g., a non-transitory computer readable medium). The instructions can be retrieved and executed by a data processing device. Some examples of instructions are software, program code, and firmware. Some examples of storage medium are memory devices, tape, disks, integrated circuits, and servers. The instructions are operational when executed by the data processing device to direct the data processing device to operate in accord with embodiments of the present disclosure. Those skilled in the art are familiar with instructions, data processing device(s), and storage medium.

The present disclosure is described above with reference to exemplary embodiments. It will be apparent to those skilled in the art that various modifications may be made and other embodiments can be used without departing from the broader scope of the present disclosure. Therefore, these and other variations upon the exemplary embodiments are intended to be covered by the present disclosure.

The invention claimed is:

1. A non-transitory computer readable medium comprising executable instructions, the instructions being executable by a data processing device to perform a method, the method comprising:
   receiving text from a plurality of documents;
   for each document of the plurality of documents:
      segmenting the received text of the particular document of the plurality of documents to create a set of segments;
      for each of at least a subset of the set of segments:
         calculating a document frequency statistic indicating a frequency of a particular segment of the at least a subset of the segments within the particular document of the plurality of documents;
         comparing the document frequency statistic indicating the frequency of the particular segment within the particular document to a frequency threshold;
         determining if the particular segment is a segment of potential interest based on the comparison of the document frequency statistic of the particular segment to the frequency threshold; and
         calculating a distance between the particular document of the plurality of documents and each of the other documents of the plurality of documents using a text metric;
   receiving a search query and performing a search on the received text of the plurality of documents to generate search results, the search results including at least a subset of documents of the plurality of documents;
   dividing the at least the subset of the documents of the plurality of documents of the search results between a first set and a guide set;
   for each of the documents of the first set, determining a closest document of the guide set using the distances for that particular document to create partitions of documents;
   for each partition of documents:
      retrieving the document frequency statistics of each segment of potential interest of each document in the particular partition of documents;
      selecting a predetermined number of segments of potential interest of the documents in the particular partition of documents based on a highest frequency statistic of the retrieved document frequency statistics; and
      determining identifying information associated with at least some content of the predetermined number of segments of potential interest of the documents in the particular partition of documents; and
   providing the identified content of at least one partition for display.

2. The non-transitory computer readable medium of claim 1, the method further comprising providing the identified content for all of the partitions.

3. The non-transitory computer readable medium of claim 1, the method further comprising displaying the identified content of the at least one partition.

4. The non-transitory computer readable medium of claim 1, the method further comprising generating a graph of nodes and edges connecting nodes, where each node represents a document of the search results and each edge between nodes is based on a particular distance between documents.

5. The non-transitory computer readable medium of claim 1, wherein calculating the document frequency statistic utilizes a log likelihood function, wherein calculating the document frequency statistics comprises:
   determining an expected segment score based on a total number of times the particular segment is within the plurality of documents relative to a total number of segments in the plurality of documents;
   determining an observed score based on a total number of times the particular segment is within the particular document of the plurality of documents; and
   generating a log likelihood function score based on the observed score relative to the expected score.

6. The non-transitory computer readable medium of claim 5, wherein determining if the particular segment is the segment of potential interest comprises comparing the log likelihood function score associated with the particular segment to a likelihood threshold.

7. The non-transitory computer readable medium of claim 1, wherein the distance is a result of applying a cosine term frequency-inverse document frequency (tf-idf).

8. The non-transitory computer readable medium of claim 1, the method further comprising filtering the text to remove common or unwanted phrases.

9. The non-transitory computer readable medium of claim 1, the method further comprising approximating a distance measure between two documents in the search results using a Dijkstra's algorithm.

10. A system comprising:
   at least one processor; and
   memory, the memory including executable instructions that when executed by the at least one processor performs the steps of:
      receiving text from a plurality of documents;
      for each document of the plurality of documents:
         segmenting the received text of the particular document of the plurality of documents to create a set of segments;
         for each of at least a subset of the set of segments:
            calculating a document frequency statistic indicating a frequency of a particular segment of the at least a subset of the segments within the particular document of the plurality of documents;
            comparing the document frequency statistic indicating the frequency of the particular segment within the particular document to a frequency threshold;
            determining if the particular segment is a segment of potential interest based on the comparison of the document frequency statistic of the particular segment to the frequency threshold; and
         calculating a distance between the particular document of the plurality of documents and each of the other documents of the plurality of documents using a text metric;
      receiving a search query and performing a search on the received text of the plurality of documents to generate search results, the search results including at least a subset of documents of the plurality of documents;
      dividing the at least the subset of the documents of the plurality of documents of the search results between a first set and a guide set;
      for each of the documents of the first set, determining a closest document of the guide set using the distances for that particular document to create partitions of documents;
      for each partition of documents:
         retrieving the document frequency statistics of each segment of potential interest of each document in the particular partition of documents;
         selecting a predetermined number of segments of potential interest of the documents in the particular partition of documents based on a highest frequency statistic of the retrieved document frequency statistics; and
         determining identifying information associated with at least some content of the predetermined number of segments of potential interest of the documents in the particular partition of documents; and
      providing the identified content of at least one partition for display.

11. The system of claim 10, wherein the steps further comprise providing the identified content for all of the partitions.

12. The system of claim 10, wherein the steps further comprise displaying the identified content of the at least one partition.

13. The system of claim 10, wherein the steps further comprise generating a graph of nodes and edges connecting nodes, wherein each node represents a document of the search results and each edge between nodes is based on a particular distance between documents.

14. The system of claim 10, wherein calculating the document frequency statistic utilizes a log likelihood function, wherein calculating the document frequency statistics comprises:
   determining an expected segment score based on a total number of times the particular segment is within the plurality of documents relative to a total number of segments in the plurality of documents;
   determining an observed score based on a total number of times the particular segment is within the particular document of the plurality of documents; and
   generating a log likelihood function score based on the observed score relative to the expected score.

15. The system of claim 14, wherein determining if the particular segment is the segment of potential interest comprises comparing the log likelihood function score associated with the particular segment to a likelihood threshold.

16. The system of claim 10, wherein the distance is a result of applying a cosine term frequency-inverse document frequency (tf-idf).

17. The system of claim 10, wherein the steps further comprise filtering the text to remove common or unwanted phrases.

18. The system of claim 10, wherein the steps further comprise approximating a distance measure between two documents in the search results using a Dijkstra's algorithm.

19. A method comprising:
   receiving text from a plurality of documents;
   for each document of the plurality of documents:
      segmenting the received text of the particular document of the plurality of documents to create a set of segments;
      for each of at least a subset of the set of segments:
         calculating a document frequency statistic indicating a frequency of a particular segment of the at least a subset of the segments within the particular document of the plurality of documents;
         comparing the document frequency statistic indicating the frequency of the particular segment within the particular document to a frequency threshold;
         determining if the particular segment is a segment of potential interest based on the comparison of the document frequency statistic of the particular segment to the frequency threshold; and
      calculating a distance between the particular document of the plurality of documents and each of the other documents of the plurality of documents using a text metric;
   receiving a search query and performing a search on the received text of the plurality of documents to generate search results, the search results including at least a subset of documents of the plurality of documents;
   dividing the at least the subset of the documents of the plurality of documents of the search results between a first set and a guide set;
   for each of the documents of the first set, determining a closest document of the guide set using the distances for that particular document to create partitions of documents;

for each partition of documents:
  retrieving the document frequency statistics of each segment of potential interest of each document in the particular partition of documents;
  selecting a predetermined number of segments of potential interest of the documents in the particular partition of documents based on a highest frequency statistic of the retrieved document frequency statistics; and
  determining identifying information associated with at least some content of the predetermined number of segments of potential interest of the documents in the particular partition of documents; and
providing the identified content of at least one partition for display.

* * * * *